(12) United States Patent
Spiegel et al.

(10) Patent No.: US 11,321,597 B2
(45) Date of Patent: *May 3, 2022

(54) FACIAL PATTERNS FOR OPTICAL BARCODES

(71) Applicant: Snap Inc., Santa Monica, CA (US)

(72) Inventors: Evan Spiegel, Los Angeles, CA (US); Kirk Ouimet, Orem, UT (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/881,670

(22) Filed: May 22, 2020

(65) Prior Publication Data

US 2020/0285923 A1 Sep. 10, 2020

Related U.S. Application Data

(63) Continuation of application No. 16/283,515, filed on Feb. 22, 2019, now Pat. No. 10,699,174, which is a
(Continued)

(51) Int. Cl.
*G06K 9/00* (2022.01)
*G06K 19/06* (2006.01)
*G06T 7/33* (2017.01)

(52) U.S. Cl.
CPC . *G06K 19/06103* (2013.01); *G06K 19/06037* (2013.01); *G06T 7/33* (2017.01)

(58) Field of Classification Search
CPC ............. G06K 9/00288; G06K 9/6296; G06K 9/00248; G06K 9/00281; G06K 9/00287;
(Continued)

(56) References Cited

U.S. PATENT DOCUMENTS

| 5,591,956 A | 1/1997 | Longacre, Jr. et al. |
| 6,038,295 A | 3/2000 | Mattes |

(Continued)

FOREIGN PATENT DOCUMENTS

| CA | 2887596 A1 | 7/2015 |
| CN | 102046391 | 5/2011 |

(Continued)

OTHER PUBLICATIONS

U.S. Appl. No. 14/612,409 U.S. Pat. No. 9,111,164, filed Feb. 3, 2015, Custom Functional Patterns for Optical Barcodes.
(Continued)

*Primary Examiner* — Amir Alavi
(74) *Attorney, Agent, or Firm* — Schwegman Lundberg & Woessner, P.A.

(57) ABSTRACT

Systems and methods for using facial patterns for information access via optical barcodes are provided. In example embodiments, a computer accesses an image. The computer determines, using facial recognition, that the accessed image includes a face. The computer determines, using the face, an orientation of the image. The computer decodes, based on the determined orientation of the image, data encoded within the geometric shape. The computer may then access a resource based on the decoded data. In some aspects, a graphical output may be presented on a display device indicating the accessed resource.

20 Claims, 18 Drawing Sheets

Related U.S. Application Data continuation of application No. 15/886,597, filed on Feb. 1, 2018, now Pat. No. 10,262,250, which is a continuation of application No. 15/074,629, filed on Mar. 18, 2016, now Pat. No. 9,911,073.

(58) Field of Classification Search
CPC ........... G06K 9/00222; G06K 9/00228; G06K 7/1417; G06K 7/1456; G06K 19/06103; G06T 7/33; G06T 15/205
See application file for complete search history.

(56) References Cited

U.S. PATENT DOCUMENTS

| | | | |
|---|---|---|---|
| 6,204,854 B1* | 3/2001 | Signes | G06T 9/00 345/427 |
| 6,327,388 B1 | 12/2001 | Zhou et al. | |
| 6,523,826 B1 | 2/2003 | Matos | |
| 6,980,909 B2 | 12/2005 | Root et al. | |
| 7,173,651 B1 | 2/2007 | Knowles | |
| 7,410,099 B2 | 8/2008 | Fukasawa et al. | |
| 7,411,493 B2 | 8/2008 | Smith | |
| 7,412,089 B2 | 8/2008 | Squires et al. | |
| 7,535,890 B2 | 5/2009 | Rojas | |
| 8,094,870 B2 | 1/2012 | Crookham et al. | |
| 8,131,597 B2 | 3/2012 | Hudetz | |
| 8,194,914 B1 | 6/2012 | Skogg | |
| 8,199,747 B2 | 6/2012 | Rojas et al. | |
| 8,332,475 B2 | 12/2012 | Rosen et al. | |
| 8,396,265 B1 | 3/2013 | Ross et al. | |
| 8,411,909 B1 | 4/2013 | Zhao et al. | |
| 8,457,367 B1 | 6/2013 | Sipe et al. | |
| 8,515,139 B1 | 8/2013 | Nechyba et al. | |
| 8,718,333 B2 | 5/2014 | Wolf et al. | |
| 8,724,622 B2 | 5/2014 | Rojas | |
| 8,814,048 B2 | 8/2014 | Taylor | |
| 8,868,902 B1 | 10/2014 | Brown et al. | |
| 8,874,677 B2 | 10/2014 | Rosen et al. | |
| 8,886,953 B1 | 11/2014 | Sipe et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,047,538 B2 | 6/2015 | Nechyba et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,111,164 B1 | 8/2015 | Anderton et al. | |
| 9,147,095 B2* | 9/2015 | Li | G06K 7/1443 |
| 9,191,776 B2 | 11/2015 | Root et al. | |
| 9,204,252 B2 | 12/2015 | Root | |
| 9,317,113 B1* | 4/2016 | Karakotsios | G06K 9/00597 |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,659,244 B2 | 5/2017 | Anderton et al. | |
| 9,911,073 B1 | 3/2018 | Spiegel et al. | |
| 10,068,117 B1 | 9/2018 | Anderton | |
| 10,146,971 B1* | 12/2018 | Cansizoglu | G06K 7/1417 |
| 10,152,634 B2* | 12/2018 | Kamath | H04N 5/2256 |
| 10,262,250 B1* | 4/2019 | Spiegel | G06T 7/33 |
| 10,410,028 B1* | 9/2019 | Cansizoglu | G06K 7/1417 |
| 10,534,949 B1 | 1/2020 | Anderton et al. | |
| 10,552,667 B1* | 2/2020 | Bogan, III | G06K 9/6262 |
| 10,699,174 B1* | 6/2020 | Spiegel | G06T 7/33 |
| 2006/0097062 A1 | 5/2006 | Cheong et al. | |
| 2006/0269136 A1 | 11/2006 | Squires et al. | |
| 2008/0048044 A1 | 2/2008 | Zhao et al. | |
| 2011/0202598 A1 | 8/2011 | Evans et al. | |
| 2011/0298941 A1 | 12/2011 | Okawa et al. | |
| 2012/0085828 A1 | 4/2012 | Ziegler | |
| 2012/0209924 A1 | 8/2012 | Evans et al. | |
| 2013/0021364 A1 | 1/2013 | Azuma et al. | |
| 2013/0201187 A1* | 8/2013 | Tong | G06K 9/6255 345/420 |
| 2013/0247175 A1 | 9/2013 | Nechyba et al. | |
| 2014/0263674 A1 | 9/2014 | Cerveny et al. | |
| 2015/0286481 A1 | 10/2015 | Walker | |
| 2016/0070898 A1 | 3/2016 | Kwok-suzuki et al. | |
| 2016/0210545 A1 | 7/2016 | Anderton et al. | |
| 2016/0379041 A1 | 12/2016 | Rhee et al. | |
| 2019/0102528 A1* | 4/2019 | Beacham | G06K 9/00255 |
| 2020/0117872 A1 | 4/2020 | Anderton et al. | |

FOREIGN PATENT DOCUMENTS

| | | |
|---|---|---|
| CN | 103914851 | 7/2014 |
| CN | 107430697 A | 12/2017 |
| KR | 102018143 | 11/2019 |
| WO | WO-2016118338 A1 | 7/2016 |

OTHER PUBLICATIONS

U.S. Appl. No. 14/826,301 U.S. Pat. No. 9,659,244, filed Aug. 14, 2015, Custom Functional Patterns for Optical Barcodes.

U.S. Appl. No. 15/491,842 U.S. Pat. No. 10,068,117, filed Apr. 19, 2017, Custom Functional Patterns for Optical Barcodes.

U.S. Appl. No. 16/058,490 U.S. Pat. No. 10,534,949, filed Aug. 8, 2018, Custom Functional Patterns for Optical Barcodes.

U.S. Appl. No. 16/713,946, filed Dec. 13, 2019, Custom Functional Patterns for Optical Barcodes.

U.S. Appl. No. 15/074,629 U.S. Pat. No. 9,911,073, filed Mar. 18, 2016, Facial Patterns for Optical Barcodes.

U.S. Appl. No. 15/886,597 U.S. Pat. No. 10,262,250, filed Feb. 1, 2018, Facial Patterns for Optical Barcodes.

U.S. Appl. No. 15/458,670 U.S. Pat. No. 10,146,971, filed Mar. 14, 2017, Optical Barcodes Without Orientation.

U.S. Appl. No. 16/283,515, filed Feb. 22, 2019, Facial Patterns for Optical Barcodes.

U.S. Appl. No. 16/181,237 U.S. Pat. No. 10,410,028, filed Nov. 5, 2018, Optical Barcodes Without Orientation.

"Korean Application Serial No. 10-2017-7023059, Response Filed Feb. 14, 2019 to Notice of Preliminary Rejection dated Dec. 14, 2018", w/ English Claims, 34 pgs.

"Korean Application Serial No. 10-2019-7025362, Notice of Preliminary Rejection dated Sep. 25, 2019", w/ English Translation, 5 pgs.

"Korean Application Serial No. 10-2019-7025362, Response filed Nov. 25, 2019 to Notice of Preliminary Rejection dated Sep. 25, 2019", w/ English Claims, 16 pgs.

"Chinese Application Serial No. 201680016324.1, Office Action dated Dec. 3, 2019", w/ English Translation, 9 pgs.

"European Application Serial No. 16740501.8, Communication Pursuant to Article 94(3) EPC dated Mar. 18, 2020", 5 pgs.

"Chinese Application Serial No. 201680016324.1, Response filed Apr. 3, 2020 to Office Action dated Dec. 3, 2019", w/o English Translation, 8 pgs.

"U.S. Appl. No. 16/713,946, Non Final Office Action dated Jun. 17, 2020", 8 pgs.

"U.S. Appl. No. 14/612,409, Final Office Action dated Jun. 10, 2015", 10 pgs.

"U.S. Appl. No. 14/612,409, Non Final Office Action dated Mar. 26, 2015", 10 pgs.

"U.S. Appl. No. 14/612,409, Notice of Allowance dated Jun. 30, 2015", 8 pgs.

"U.S. Appl. No. 14/612,409, Response filed Jun. 1, 2015 to Non Final Office Action dated Mar. 26, 2015", 12 pgs.

"U.S. Appl. No. 14/826,301, Non Final Office Action dated Sep. 8, 2016", 14 pgs.

"U.S. Appl. No. 14/826,301, Notice of Allowance dated Jan. 19, 2017", 9 pgs.

"U.S. Appl. No. 14/826,301, Response filed Dec. 8, 2016 to Non Final Office Action dated Sep. 8, 2016", 11 pgs.

"U.S. Appl. No. 15/074,629, Non Final Office Action dated Jun. 15, 2017", 10 pgs.

"U.S. Appl. No. 15/074,629, Notice of Allowance dated Oct. 25, 2017", 8 pgs.

"U.S. Appl. No. 15/074,629, Response filed Sep. 15, 2017 to Non Final Office Action dated Jun. 15, 2017", 7 pgs.

(56) References Cited

OTHER PUBLICATIONS

"U.S. Appl. No. 15/458,670, Examiner Interview Summary dated Mar. 21, 2018", 3 pgs.
"U.S. Appl. No. 15/458,670, Non Final Office Action dated Nov. 30, 2017", 7 pgs.
"U.S. Appl. No. 15/458,670, Notice of Allowance dated Jul. 27, 2018", 7 pgs.
"U.S. Appl. No. 15/458,670, Response Filed Mar. 29, 2018 to Non Final Office Action dated Nov. 30, 2017", 11 pgs.
"U.S. Appl. No. 15/491,842, Non Final Office Action dated Oct. 19, 2017", 7 pgs.
"U.S. Appl. No. 15/491,842, Notice of Allowance dated May 1, 2018", 8 pgs.
"U.S. Appl. No. 15/491,842, Preliminary Amendment filed Jun. 19, 2017", 7 pgs.
"U.S. Appl. No. 15/491,842, Response filed Feb. 19, 2018 to Non Final Office Action dated Oct. 19, 2017", 12 pgs.
"U.S. Appl. No. 15/886,597, Examiner Interview Summary dated Aug. 13, 2018", 3 pgs.
"U.S. Appl. No. 15/886,597, Non Final Office Action dated Jun. 14, 2018", 16 pgs.
"U.S. Appl. No. 15/886,597, Notice of Allowance dated Nov. 23, 2018", 8 pgs.
"U.S. Appl. No. 15/886,597, Response Filed Aug. 21, 2018 to Non Final Office Action dated Jun. 14, 2018", 10 pgs.
"U.S. Appl. No. 16/058,490, Non Final Office Action dated May 3, 2019", 7 pgs.
"U.S. Appl. No. 16/058,490, Notice of Allowance dated Sep. 6, 2019", 8 pgs.
"U.S. Appl. No. 16/058,490, Preliminary Amendment filed Sep. 10, 2018", 6 pgs.
"U.S. Appl. No. 16/058,490, Response filed Aug. 5, 2019 to Non-Final Office Action dated May 3, 2019", 13 pgs.
"U.S. Appl. No. 16/181,237, Non Final Office Action dated Dec. 26, 2018", 6 pgs.
"U.S. Appl. No. 16/181,237, Notice of Allowance dated May 17, 2019", 7 pgs.
"U.S. Appl. No. 16/181,237, Response filed Mar. 6, 2019 to Non Final Office Action dated Dec. 26, 2018", 2 pgs.
"U.S. Appl. No. 16/283,515, Non Final Office Action dated Oct. 2, 2019", 8 pgs.
"U.S. Appl. No. 16/283,515, Notice of Allowance dated Feb. 27, 2020", 8 pgs.
"U.S. Appl. No. 16/283,515, Response filed Dec. 27, 2019 to Non Final Office Action dated Oct. 2, 2019", 7 pgs.
"European Application Serial No. 16740501.8, Extended European Search Report dated Nov. 9, 2017", 5 pgs.
"International Application Serial No. PCT/US2016/012669, International Preliminary Report on Patentability dated Aug. 3, 2017", 11 pgs.
"International Application Serial No. PCT/US2016/012669, International Search Report dated Mar. 16, 2016", 2 pgs.
"International Application Serial No. PCT/US2016/012669, Written Opinion dated Mar. 16, 2016", 9 pgs.
"Korean Application Serial No. 10-2017-7023059, Notice of Preliminary Rejection dated Dec. 14, 2018", W/ English Translation, 15 pgs.
"Matrix Symbologies", Advancing Identification Matters (AIM), [Online] Retrieved from the Internet on Mar. 20, 2015: <URL: http://www.aimglobal.org/?page=matrix_symb>, (Mar. 6, 2013), 2 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
"U.S. Appl. No. 16/713,946, Response filed Oct. 29, 2020 to Non Final Office Action dated Jun. 17, 2020", 12 pgs.
"U.S. Appl. No. 16/713,946, Final Office Action dated Nov. 12, 2020", 8 pgs.
"U.S. Appl. No. 16/713,946, Response filed Feb. 12, 2021 to Final Office Action dated Nov. 12, 2020", 9 pgs.
"U.S. Appl. No. 16/713,946, Final Office Action dated Jun. 30, 2021", 9 pgs.
"U.S. Appl. No. 16/713,946, Non Final Office Action dated Feb. 22, 2021", 11 pgs.
"U.S. Appl. No. 16/713,946, Response filed Jun. 22, 2021 to Non Final Office Action dated Feb. 22, 2021", 10 pgs.
"U.S. Appl. No. 16/713,946, Response filed Oct. 28, 2021 to Final Office Action dated Jun. 30, 2021", 10 pgs.
"BeeTagg", Vasco Mouta, [Online] Retrieved from the Internet: <URL: http://www.vascomouta.com/pt/portfolio/beetagg.html>, (Feb. 2006), 5 pgs.
"U.S. Appl. No. 16/713,946, Notice of Allowance dated Dec. 22, 2021", 9 pgs.

\* cited by examiner

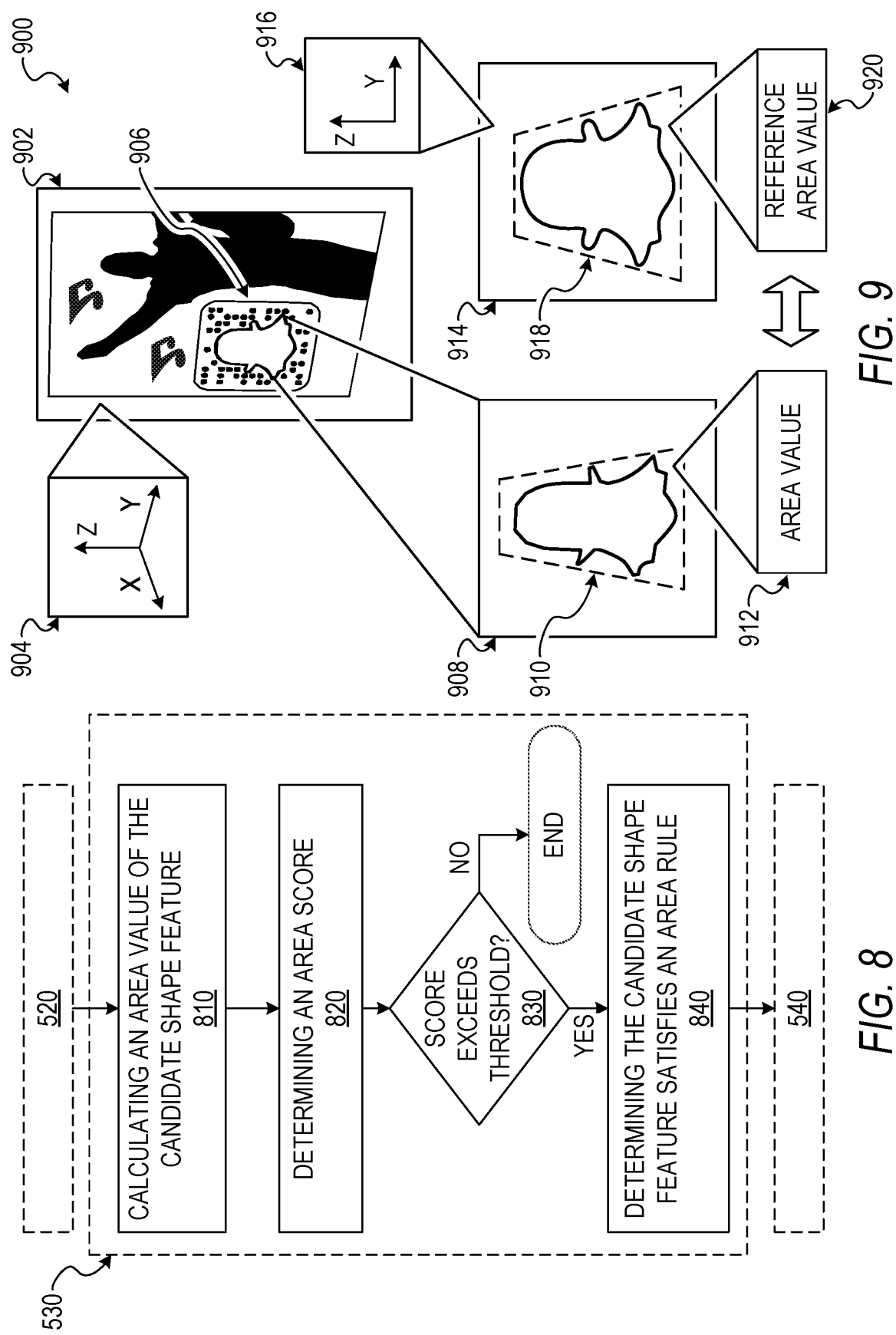

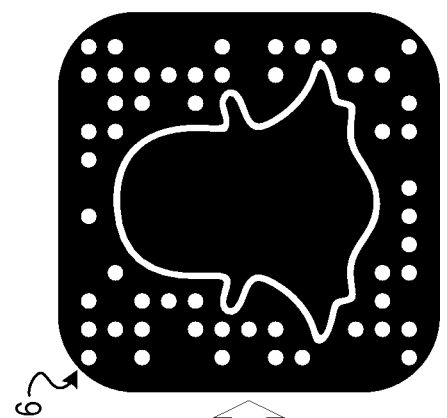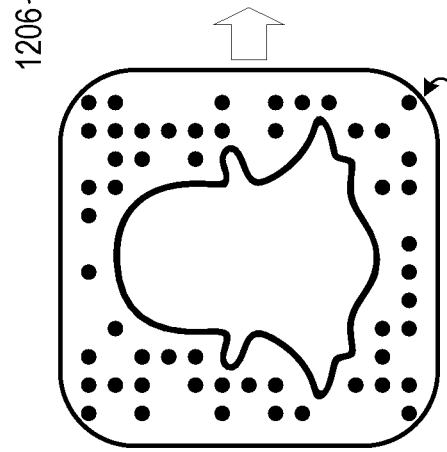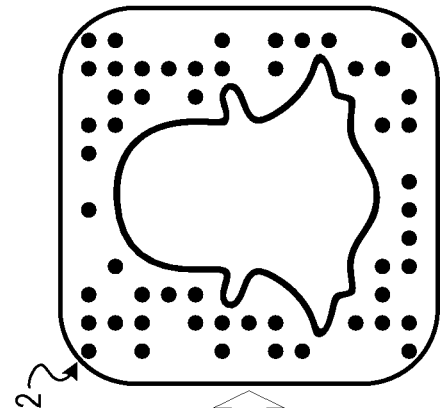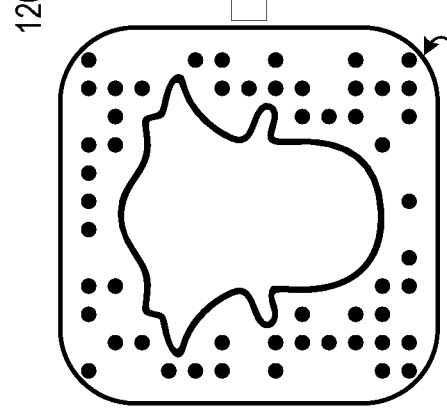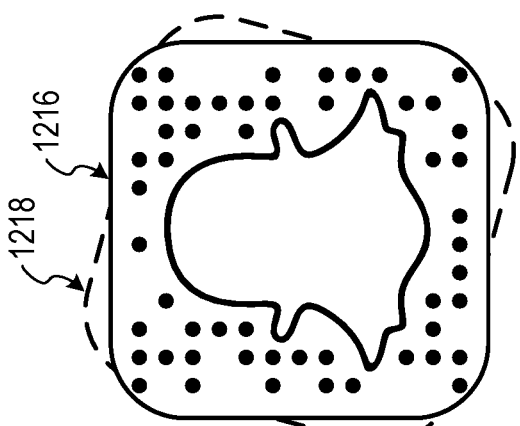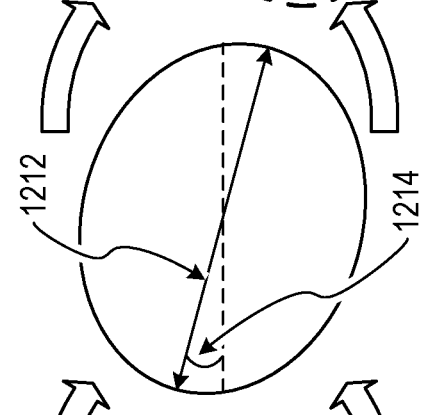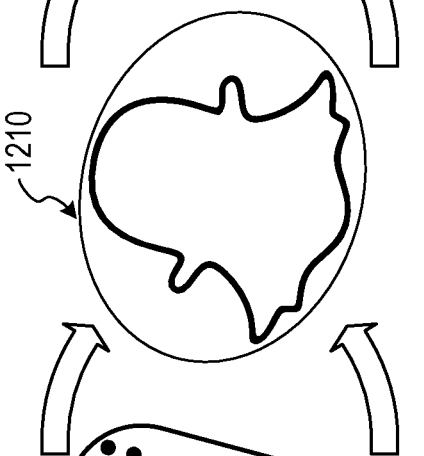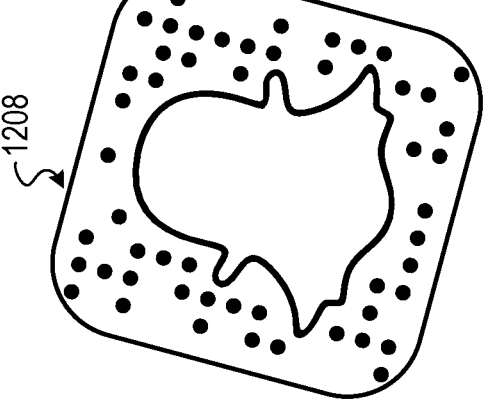
FIG. 12A
FIG. 12B
FIG. 12C

FACIAL PATTERNS FOR OPTICAL BARCODES

CROSS REFERENCE TO RELATED APPLICATIONS

This application is a continuation of and claims priority to U.S. patent application Ser. No. 16/283,515, filed on Feb. 22, 2019, which is a continuation of and claims priority to U.S. patent application Ser. No. 15/886,597, filed on Feb. 1, 2018, which is a continuation of and claims priority to U.S. patent application Ser. No. 15/074,629, filed on Mar. 18, 2016. The contents of these prior applications are considered part of this application, and are hereby incorporated by reference in their entireties.

TECHNICAL FIELD

Embodiments of the present disclosure relate generally to mobile computing technology and, more particularly, but not by way of limitation, to facial patterns for optical barcodes.

BACKGROUND

Quick Response (QR) codes, and other optical barcodes, are a convenient way to share small pieces of information with users of mobile devices, wearable devices, and other smart devices. Typically, an optical barcode uses a finder pattern for identification of the optical barcode. Conventional finder patterns commonly use multiple generic markings conspicuously placed within the optical barcode. Such conspicuous and generic markings can be unsightly and often serve no purpose other than to function as a finder pattern.

BRIEF DESCRIPTION OF THE DRAWINGS

Various ones of the appended drawings merely illustrate example embodiments of the present disclosure and should not be considered as limiting its scope.

FIG. 8 is a flow diagram illustrating further example operations for identifying the optical barcode using the custom functional pattern, according to some example embodiments.

FIG. 9 is a diagram illustrating an example of identifying the optical barcode using the custom functional pattern, according to some example embodiments.

FIGS. 12A, 12B, and 12C are diagrams illustrating various image transformations used to facilitate decoding the optical barcode using the custom functional pattern, according to some example embodiments.

DETAILED DESCRIPTION

Figure 1:
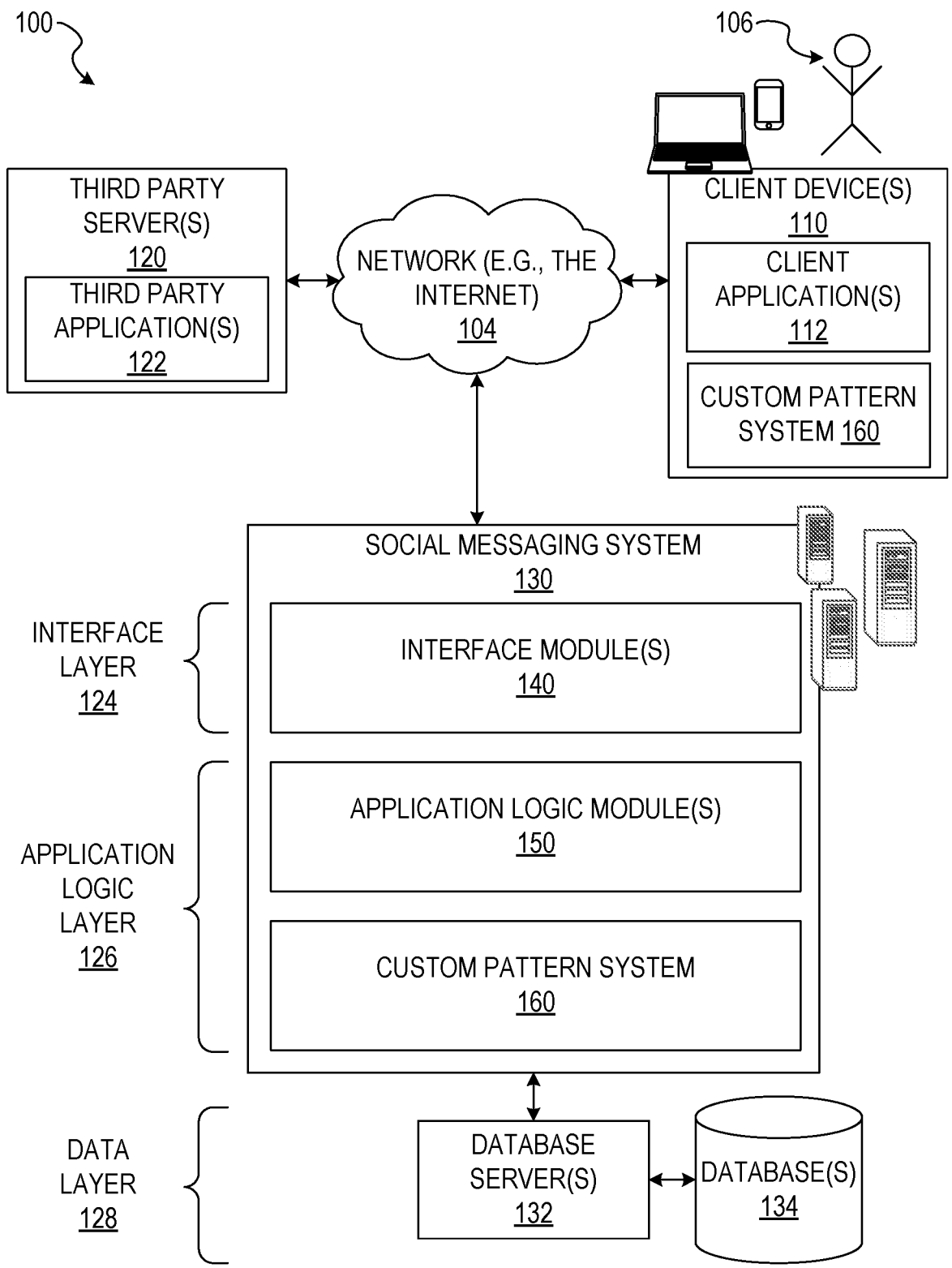
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

QR codes, and other optical barcodes (e.g., Universal Product Code (UPC) barcodes, Aztec code, Data Matrix, Dataglyph, MaxiCode, PDF417, Ultra Code), are a convenient way to share small pieces of information with users of mobile devices, wearable devices, and other smart devices. For instance, QR codes are two-dimensional optical barcodes that encode information readable by a device (e.g., a smart phone) equipped with a camera sensor. Typically, a QR code includes one or more functional patterns such as a finder pattern used for identification and recognition of the QR code or an alignment pattern used to facilitate decoding. Conventional finder patterns comprise multiple markings that are generic in design such as square marks placed in all corners except the bottom right corner (as is the case with a QR code). These finder patterns are absent aesthetic elements such as curves, non-uniformities, and other stylistic elements and often conform to a particular standard to promote open use of the optical barcode.

In various example embodiments, an optical barcode that uses custom patterns, non-standard functional patterns, or facial patterns provides users with an aesthetically pleasing, branded or facial barcode that allows for an exclusive experience associated with the optical barcode. For example, an entity logo (e.g., a logo of a company, organization, or individual) can be used as a finder pattern, and in some instances an alignment pattern, to create a branded and exclusive optical barcode that is machine-readable using software provided by the entity. In a specific example, a "snapcode" is an optical barcode that uses the SNAPCHAT® logo as a functional pattern. Alternatively, a "snapcode" may include an image of a face, such as a photograph of a human face or an avatar of a human face, in place of the SNAPCHAT® logo.

In an example embodiment, a custom pattern system receives image data representing an image from a user device. For example, the custom pattern system receives the image data from an optical sensor (e.g., a camera sensor) of a smart phone of the user. In various embodiments, the image data from the user device is received in response to a user-initiated image capture, a periodic monitoring of image data being detected by the optical sensor of the user device, an access of stored image data, or a combination thereof. A portion of the image data can include data representing an optical barcode employing a custom graphic for a particular functional pattern (e.g., a finder pattern). In some scenarios, the image data includes extraneous or irrelevant data along with the data pertaining to the optical barcode (e.g., an image of an optical barcode includes a background that is not pertinent to decoding the optical barcode). In a specific example, the optical sensor of the user device captures an image of a promotional poster that includes a particular optical barcode. The image of the promotional poster can include the particular optical barcode along with irrelevant portions of the promotional poster or background that surrounds the particular optical barcode.

After the custom pattern system receives the image data, the custom pattern system searches the image data of the image for the custom graphic to determine whether the image includes the optical barcode. That is to say, the custom graphic, which may be an image of a face, such as a photograph of human face or an avatar or drawing of a human face, is used as a finder pattern for recognition, identification, or detection of the optical barcode within the image. In an example embodiment, the custom pattern system searches for the custom graphic by extracting a candidate shape feature, or multiple candidate shape features, from the image data. For example, the custom pattern system performs an edge detection technique, or another image processing technique, to identify the candidate shape feature such as a contour line of the image. The custom pattern system then determines whether the candidate shape feature satisfies shape feature rules or criteria. For instance, if a particular candidate shape feature is a contour line, the custom pattern system can determine whether the contour line is an enclosed line that encircles a portion of the image. Consistent with some embodiments, the shape feature rules filter out irrelevant or extraneous candidate shape features or candidate shape features with a low probability of being the custom graphic. Alternatively, instead of using a candidate shape to recognize the custom pattern, facial recognition technology can be used to identify a face.

In response to the candidate shape feature satisfying the shape feature rules, the custom pattern system identifies the custom graphic by comparing the candidate shape feature with a reference shape feature of the custom graphic. For example, the custom pattern system can compare an area or size of the candidate shape feature with a reference area or size of the reference shape feature. In this example, the custom pattern system identifies the custom graphic based on a match or near match (e.g., a percentage match above a threshold) between the candidate shape feature and the reference shape feature. In this way, the custom pattern system uses the custom graphic as a finder pattern to identify the presence of the optical barcode within a portion of the image.

In further example embodiments, the custom graphic or the recognized face functions as an alignment pattern to facilitate the custom pattern system decoding the data encoded in the optical barcode. In an example embodiment, the custom pattern system extracts spatial attributes of the custom graphic in the image from the image data. For example, the custom pattern system extracts a position, scale, or orientation of the custom graphic from the image data. The custom pattern system decodes data encoded in the image from the image data using the spatial attributes of the custom graphic in the image. For instance, the custom pattern system can perform an image transform using the spatial attributes (e.g., a de-skew, a rotation, a scale, or another type of image transform) to improve detectability/readability of data encoded in a portion of the image. In this way, the custom pattern system uses the custom graphic as an alignment pattern to facilitate decoding the optical barcode.

Accordingly, the custom pattern system uses the custom graphic as a functional pattern of the optical barcode without utilizing conventional functional patterns. Using the custom graphic as a functional pattern allows for an aesthetically pleasing design and can provide exclusivity to a particular software application as the functional pattern does not necessarily conform to an open standard and thus is readable exclusively by the particular software application.

Some aspects of the subject technology include implementations of facial recognition. Facial recognition may include using a skin texture analyzer to recognize presence of human skin in an image. Facial recognition may include using a facial landmark detector to recognize features of a face, such as eyes, nose, mouth, ears, and hair. Facial recognition may include using a two dimensional (2D) or three dimensional (3D) facial mapper to create a map of the face and to verify that the features of the face, detected by the facial landmark detector, likely correspond to a real human face. Facial recognition may include using an output generator which generates an output indicating whether a face exists in the image. The output may be a visual output or data provided to another module within the computer implementing facial recognition or to another computer over a network.

Some aspects of the subject technology relate to accessing a resource based on decoded information from an image including a face. A computer accesses an image that includes a geometric shape, such as a rectangle with rounded corners. The computer determines, using facial recognition technology, whether the image includes a face inside the geometric shape. Upon determining that the image includes the face inside the geometric shape, the computer determines, using the face inside the geometric shape, an orientation of the geometric shape. The computer decodes, based on the determined orientation of the geometric shape, data encoded within the geometric shape. The computer accesses, via a network, a resource that corresponds to the decoded data. The resource may be a link for creating an "add friend" request for a new contact in a messaging application. The computer presents, at a display device, a graphical output corresponding to the accessed resource, for example, a graphical interface for sending a message to the new contact.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. Of course, additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although the social messaging system 130 is depicted in FIG. 1 as a three-tiered architecture, the inventive subject matter is by no means limited to such an architecture.

As shown in FIG. 1, the interface layer 124 consists of one or more interface modules (e.g., a web server) 140, which receive requests from various client-computing devices and servers, such as client device(s) 110 executing client application(s) 112, and third party server(s) 120 executing third party application(s) 122. In response to received requests, the interface module(s) 140 communicate appropriate responses to requesting devices via a network 104. For example, the interface module(s) 140 can receive requests such as Hypertext Transfer Protocol (HTTP) requests, or other web-based Application Programming Interface (API) requests.

The client device(s) 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client device(s) 110 are executing the client application(s) 112. The client application(s) 112 can provide functionality to present information to a user 106 and communicate via the network 104 to exchange information with the social messaging system 130. Each client device 110 can comprise a computing device that includes at least a display and communication capabilities with the network 104 to access the social messaging system 130. The client device(s) 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Users 106 can include a person, a machine, or other means of interacting with the client devices 110. In some embodiments, the users 106 interact with the social messaging system 130 via the client device(s) 110.

As shown in FIG. 1, the data layer 128 has one or more database servers 132 that facilitate access to information storage repositories or databases 134. The database(s) 134 are storage devices that store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic modules 150, which, in conjunction with the interface module(s) 140, generate various user interfaces with data retrieved from various data sources or data services in the data layer 128. Individual application logic module(s) 150 may be used to implement the functionality associated with various applications, services, and features of the social messaging system 130. For instance, a social messaging application can be implemented with one or more of the application logic module(s) 150. The social messaging application provides a messaging mechanism for users of the client device(s) 110 to send and receive messages that include text and media content such as pictures and video. The client device(s) 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic module(s) 150.

As illustrated in FIG. 1, the social messaging system 130 or the client application(s) 112 includes a custom pattern system 160 that provides functionality to identify and decode optical barcodes that employ custom functional patterns. In various embodiments, the custom pattern system 160 can be implemented as a standalone system and is not necessarily included in the social messaging system 130. In some embodiments, the client device(s) 110 includes a portion of the custom pattern system 160 (e.g., a portion of the custom pattern system 160 may be included independently or in the client application(s) 112). In embodiments where the client device(s) 110 includes a portion of the custom pattern system 160, the client device(s) 110 can work alone or in conjunction with the portion of the custom pattern system 160 included in a particular application server or included in the social messaging system 130.

Figure 2:
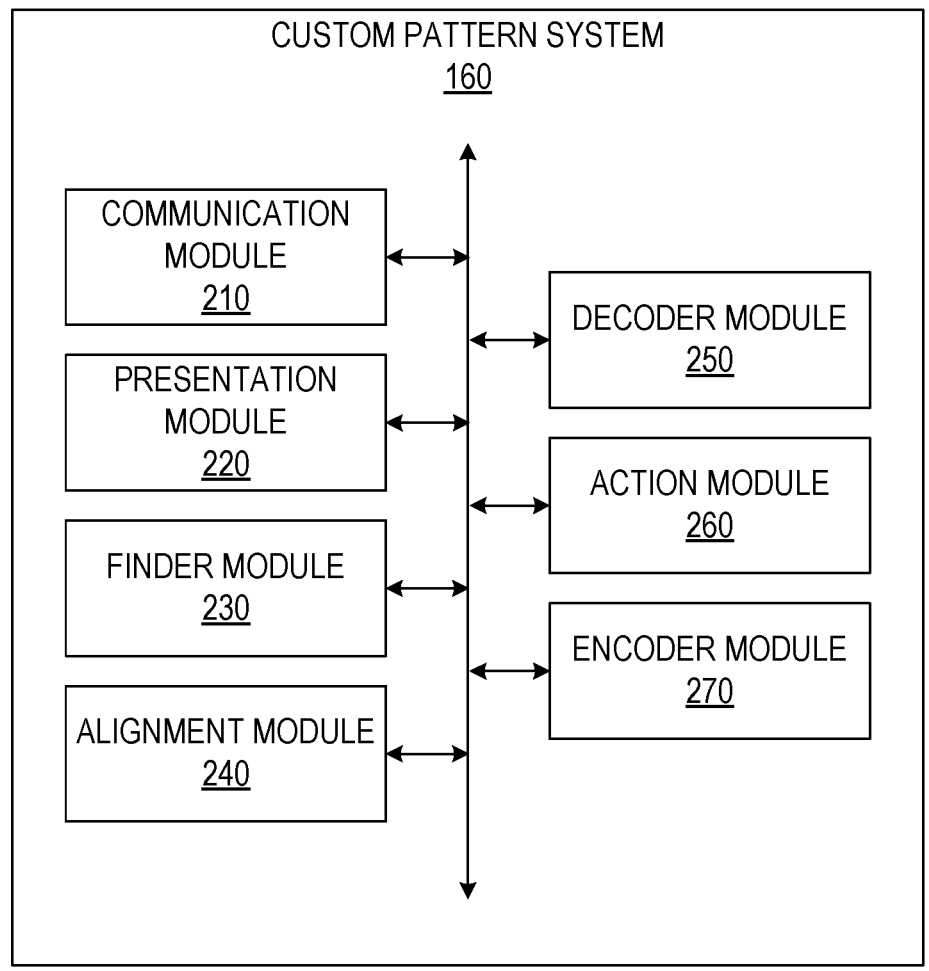
FIG. 2 is a block diagram illustrating an example embodiment of a custom pattern system, according to some example embodiments.

FIG. 2 is a block diagram 200 of the custom pattern system 160. The custom pattern system 160 is shown to include a communication module 210, a presentation module 220, a finder module 230, an alignment module 240, a decoder module 250, an action module 260, and an encoder module 270. All, or some, of the modules 210-270 communicate with each other, for example, via a network coupling, shared memory, and the like. Each module of the modules 210-270 can be implemented as a single module, combined into other modules, or further subdivided into multiple modules. Other modules not pertinent to example embodiments can also be included, but are not shown.

The communication module 210 provides various communications functionality. For example, the communication module 210 receives, accesses, or otherwise obtains image data of an image from a user device. In a specific example, the communication module 210 receives substantially real-time image data from a camera sensor of a smart phone (e.g., a single frame of image data or a continuous stream of frames captured by a camera sensor of the smart phone). The communication module 210 exchanges network communications with the database server(s) 132, the client device(s) 110, and the third party servers) 120. The information retrieved by the communication module 210 includes data associated with the user (e.g., user 106) (e.g., member profile data from an online account or social network service data) or other data to facilitate the functionality described herein.

The presentation module 220 provides various presentation and user interface functionality operable to interactively present and receive information to and from the user. For instance, the presentation module 220 is utilizable to present user interfaces generated in response to decoding the optical barcode. In other instances, the presentation module 220 generates user interfaces that include optical barcode(s). In various embodiments, the presentation module 220 presents or causes presentation of information (e.g., visually displaying information on a screen, acoustic output, haptic feedback). The process of interactively presenting information is intended to include the exchange of information between a particular device and the user. The user may provide input to interact with the user interface in many possible manners, such as alphanumeric, point based (e.g., cursor), tactile, or other input (e.g., touch screen, tactile sensor, light sensor, infrared sensor, biometric sensor, microphone, gyroscope, accelerometer, or other sensors). The presentation module 220 provides many other user interfaces to facilitate functionality described herein. The term "presenting" as used herein is intended to include communicating information or instructions to a particular device that is operable to perform presentation based on the communicated information or instructions.

The finder module 230 provides image processing functionality to identify, recognize, or detect the custom graphic being employed as a finder pattern in the optical barcode. For example, the finder module 230 extracts and analyzes candidate shape features or candidate contour characteristics from image data of the image received from the user device (e.g., the client device(s) 110). The finder module 230 determines satisfaction of various rules or criteria associated with the extracted candidate shape features. The finder module 230 compares the extracted candidate shape features with reference shape features of the custom graphic, or another reference image, to identify the custom graphic included in the image. The finder module 230 can employ a wide variety of schemes and techniques to extract the candidate shape features from the image data of the image and subsequently identify the custom graphic based on an analysis of the candidate shape features. Examples of those techniques are illustrated later with respect to FIGS. 5-14.

The alignment module 240 provides image processing functionality to determine an alignment of the optical barcode using the custom graphic. The custom pattern system 160 can use the alignment to facilitate decoding of data encoded in the optical barcode. In this way, the custom graphic functions as an alignment pattern for the optical barcode. For example, the alignment module 240 extracts spatial attributes of the custom graphic in the image from the image data. In various embodiments, the spatial attributes include at least one of position, orientation, scale, or another spatial aspect of the optical barcode. The alignment module 240 determines an alignment of the optical barcode based on the spatial attributes (e.g., a particular orientation of the optical barcode). In an example, the alignment module 240 can determine an alignment including position and orientation based on the spatial attributes and generate a transformed image according to the alignment. The custom pattern system 160 can then use the transformed image to decode data encoded in a portion of the transformed image.

The decoder module 250 provides functionality to decode data encoded in the image using the spatial attributes or the determined alignment of the custom graphic in the image. For instance, the decoder module 250 can decode the data encoded in the image from an image transformed according to the spatial attributes of the custom graphic extracted from image data. In an embodiment, the decoder module 250 detects markings (e.g., high contrast dots, squares, or other marks in the image) representing data encoded in a portion of the image from the image data. In a specific example, the decoder module 250 employs a Reed-Solomon error correction scheme (or other error correction scheme) to decode data encoded in the image. The Reed-Solomon error correction scheme (or other error correction scheme) allows for a successful or valid decoding even when a certain percentage of data could not be decoded from the optical barcode (e.g., damaged bits or incorrectly decoded bits). In some embodiments, the user or an administrator of the custom pattern system 160 configures a tolerance value for an amount of damaged or incorrectly decoded data acceptable when decoding the optical barcode. In some embodiments, the decoder module 250 also provides image processing functionality to improve decoding of the optical barcode. For instance, the decoder module 250, as well as the alignment module 240, can perform image transforms of the image (e.g., perform image sharpening, de-noise processing, other digital filtering, or other image processing techniques to improve decoding accuracy).

The action module 260 provides functionality to perform a variety of actions based on decoding the data encoded in the image. For example, the data encoded in a portion of the image can indicate a particular action or include information to be used in conjunction with a particular action. In a specific example, the data encoded in a portion of the image can comprise a user name, or other user identification, of a member of a social networking service and based on decoding the user name, the action module 260 can perform an action on the social networking service corresponding to the user name (e.g., sending a message to the member associated with the user name). In some embodiments, the action module 260 performs an action specific to a particular app that scans the image (e.g., a function available to a user of the app but otherwise unavailable). In some instances, the action module 260 performs the action without communicating with an external server (e.g., an action locally performed on the user device that scanned the snapcode).

The encoder module 270 provides functionality to generate and encode data into an optical barcode that employs the custom graphic as one or more functional patterns (e.g., generating snapcodes). As discussed above in connection with the decoder module 250, in a specific example the encoder module 270 can employ a technique such as Reed-Solomon error correction (or other error correction scheme) to encode data. In an example embodiment, the encoder module 270 renders a machine-readable arrangement of marks that represents the data to be encoded. The encoder module 270 can then generate the machine-readable optical barcode using the rendered arrangement of marks and the custom graphic to be used as a functional pattern.

Figure 3A:
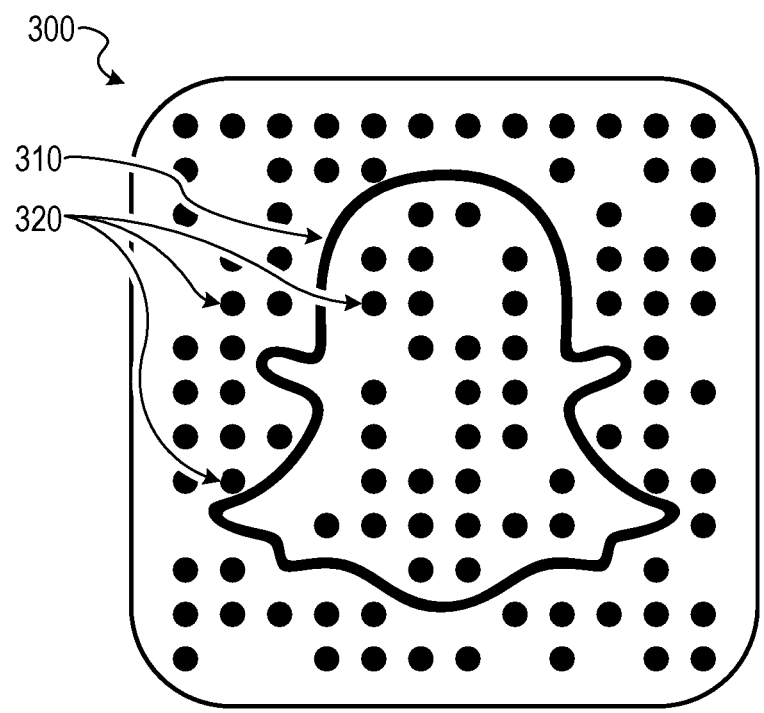
FIGS. 3A and 3B are diagrams illustrating examples of optical barcodes employing a custom functional pattern, according to some example embodiments.
Figure 3B:
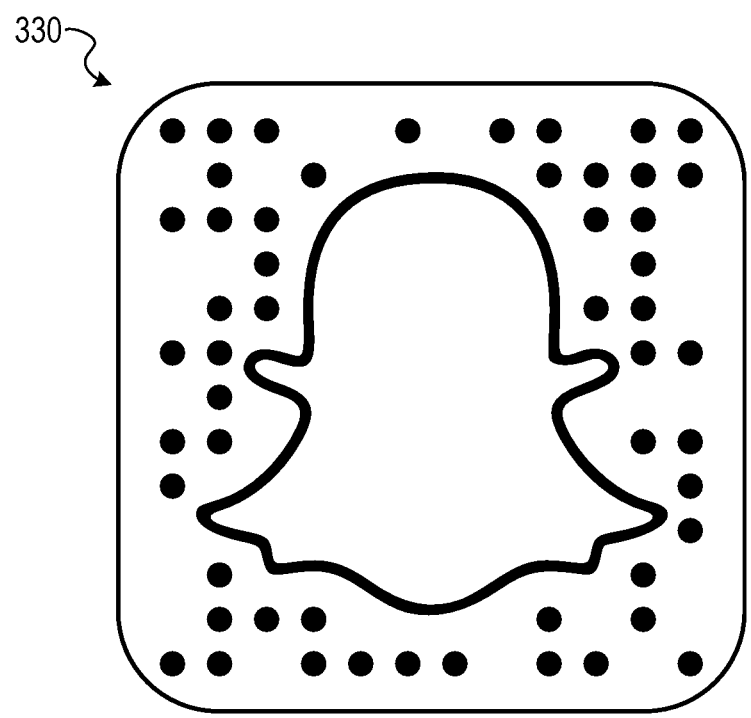

FIGS. 3A and 3B are diagrams illustrating examples of optical barcodes employing the custom graphic for a finder pattern or an alignment pattern (e.g., snapcodes). Diagram 300 shows an example optical barcode that includes a custom graphic 310 (e.g., a company logo), and markings 320 that represent data encoded into the optical barcode. In this example, the custom graphic 310 is a company logo such as the SNAPCHAT® "ghost" logo. It will be appreciated that the SNAPCHAT® "ghost" logo is merely an example custom graphic and other graphics, icons, or symbols can be employed as a finder pattern or alignment pattern using the techniques described herein. Other example custom graphics used as a functional pattern can include designs with multiple paths, multiple polygons, multiple aesthetic elements, or other design features.

In alternative embodiments, the custom graphic 310 may be different from a company logo. For example, the custom graphic 310 may be a human face that can be recognized using facial recognition technology. The custom graphic 310 may be a photograph of a human face or a drawing (e.g., avatar) of a human face. Discussions of one example of facial recognition technology are provided in this document, for instance, in conjunction with FIG. 22.

As shown in the diagram 300, the markings 320 are dots that are arranged in a pattern with a particular spacing or positioning readable by a machine. Although the diagram 300 shows the markings 320 as dots, other shapes and marks can be employed (e.g., squares or asymmetric shapes of various geometries). The markings 320 can be arranged in a uniform pattern or a non-uniform pattern. In some instances, the marks can be of different sizes or a uniform size. Additionally, the markings 320 can be in a predetermined arrangement or an arrangement that is dynamically determinable when decoding data from the markings. In some embodiments, the custom graphic 310 and the markings 320 can be surrounded by a bounding shape, such as an outer box 325. Although the outer box 325 of the diagram 300 is shown as a square with rounded corners, the outer box 325 can be in the form of a variety of other shapes with various geometries. Diagram 330 in FIG. 3B shows another example optical barcode that employs the custom graphic for a finder pattern or an alignment pattern. The diagram 330 shows the optical barcode with markings excluded from within the custom graphic. In these and other embodiments, the space internal to the custom graphic may be reserved for other uses. For example, a picture, graphic, animation, annotation, or image selected by a user may be inserted.

Figure 4:
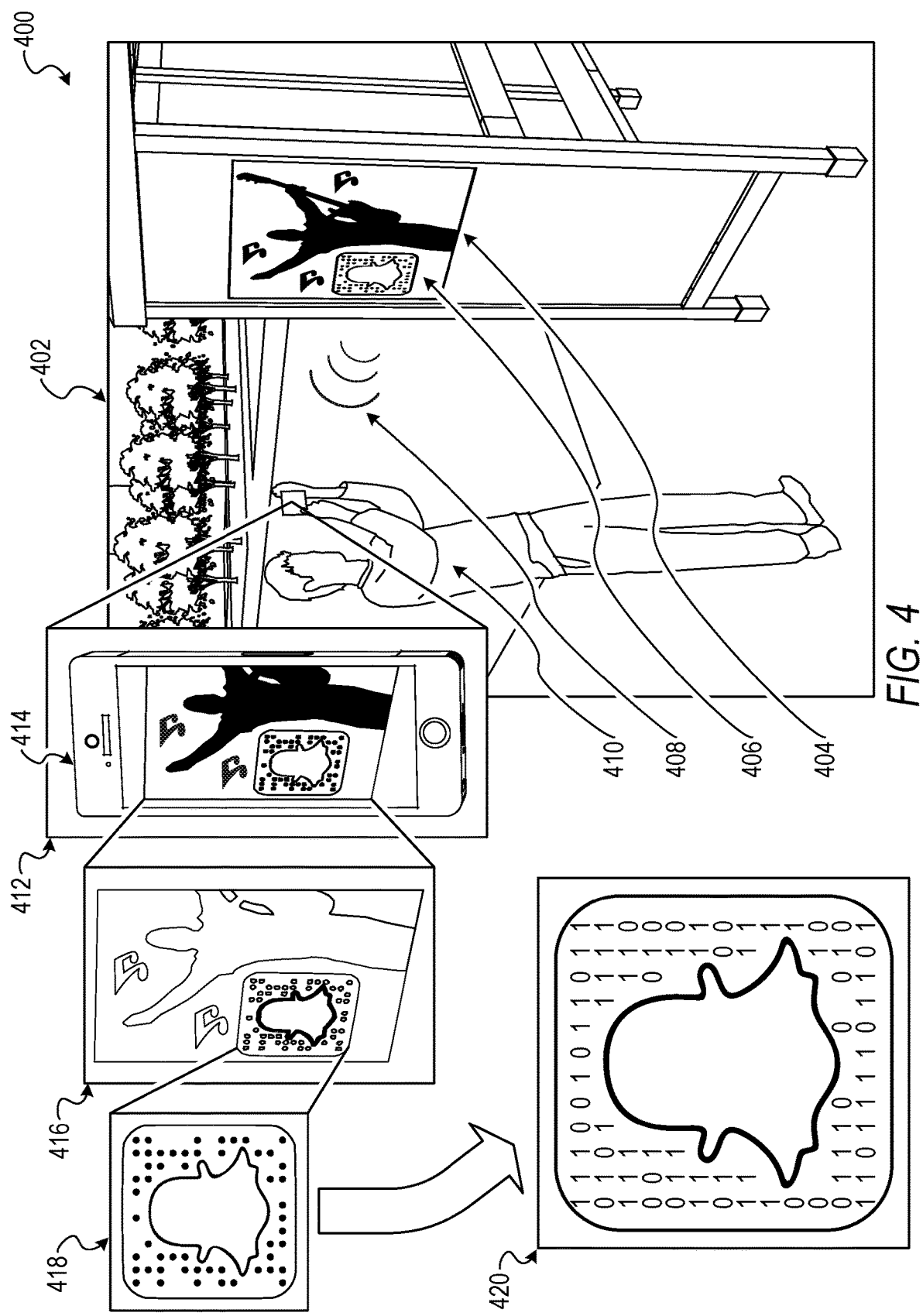
FIG. 4 is a diagram illustrating an example of identifying and decoding an optical barcode employing a custom functional pattern, according to some example embodiments.

Turning now to FIG. 4, a diagram 400 illustrating an example of identifying and decoding the optical barcode employing the custom graphic for a finder pattern or an alignment pattern is shown. FIG. 4 is an overview of a particular example embodiment of identifying and decoding the optical barcode using the custom graphic. The custom graphic may be a photograph or a drawing of a face, recognized using facial recognition technology. Additional details and alternative implementations are discussed in connection with the figures to follow. In the diagram 400, a scene 402 illustrates a poster 404 that includes an optical barcode 406 and a user 410. It will be appreciated that the optical barcode 406 can be displayed in a variety of manners such as on a user device display, a computer display, woven or otherwise affixed to an article of clothing or another product, or included in a variety of printed items. Callout 412 portrays an enlarged view of a portion of the scene 402. The callout 412 includes a user device 414 of the user 410 that includes an optical sensor (e.g., a camera sensor of a smart phone) operable to detect an optical signal 408 of the optical barcode 406.

In an example embodiment, the user device 414 captures an image of the poster 404 that includes the optical barcode 406. The custom pattern system 160 receives the image data representing the image from the user device 414. In this example embodiment, the custom pattern system 160 is included in the user device 414 (e.g., an application executing on a smart phone of the user 410), although in other example embodiments, the custom pattern system 160 can reside on a server (e.g., a server of the social messaging system 130) that is communicatively coupled with the user device 414. Callout 416 portrays example image processing the finder module 230 performs to identify the custom graphic in the image and use the custom graphic as an alignment pattern for decoding data included in the optical barcode 406. In the callout 416, the finder module 230 extracts candidate shape features from the image data of the image. Subsequently, the finder module 230 determines if the candidate features meet certain rules and criteria to filter out irrelevant shape features or shape features that have a low probability of being the custom graphic. The finder module 230 can then compare the candidate shape features that meet the shape feature criteria or rules with reference shape features of the custom graphic. In an example, the finder module 230 identifies the custom graphic based on a match between the candidate shape features and the reference shape feature (e.g., a match score that exceeds a threshold).

Subsequent to the finder module 230 identifying the custom graphic, the custom pattern system 160 can use the custom graphic as an alignment pattern for decoding. For instance, the alignment module 240 extracts spatial attributes of the custom graphic in the image and compares the extracted spatial attributes to reference spatial attributes to determine an alignment of the custom graphic. The alignment module 240 or the decoder module 250 may then generate a transformed image of the image according to the alignment (e.g., a rotation or de-skew) as shown in callout 418. After generating the transformed image, the decoder module 250 decodes the data encoded in a portion of the transformed image as shown in callout 420. In the callout 420, the dots of the optical barcode 406 are transformed into data shown as ones for dots and zeros for non-dots, although this is merely an illustrative example and other schemes can be employed. In this way, the custom pattern system 160 uses the custom graphic included in the optical barcode 406 as one or more functional patterns such as a finder pattern or an alignment pattern.

Figure 5:
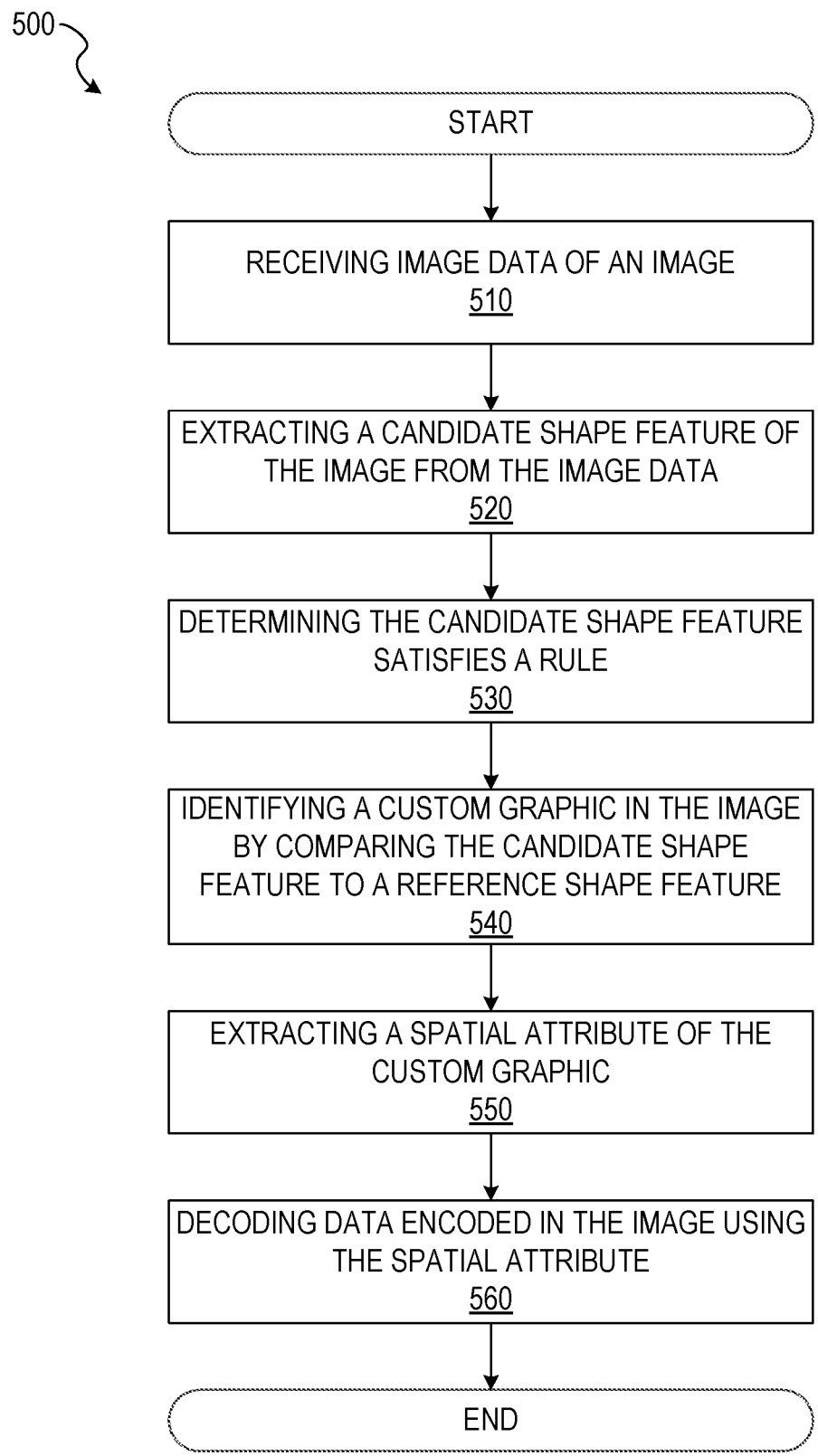
FIG. 5 is a flow diagram illustrating an example method for identifying and decoding an optical barcode using a custom functional pattern, according to some example embodiments.
Figure 7:
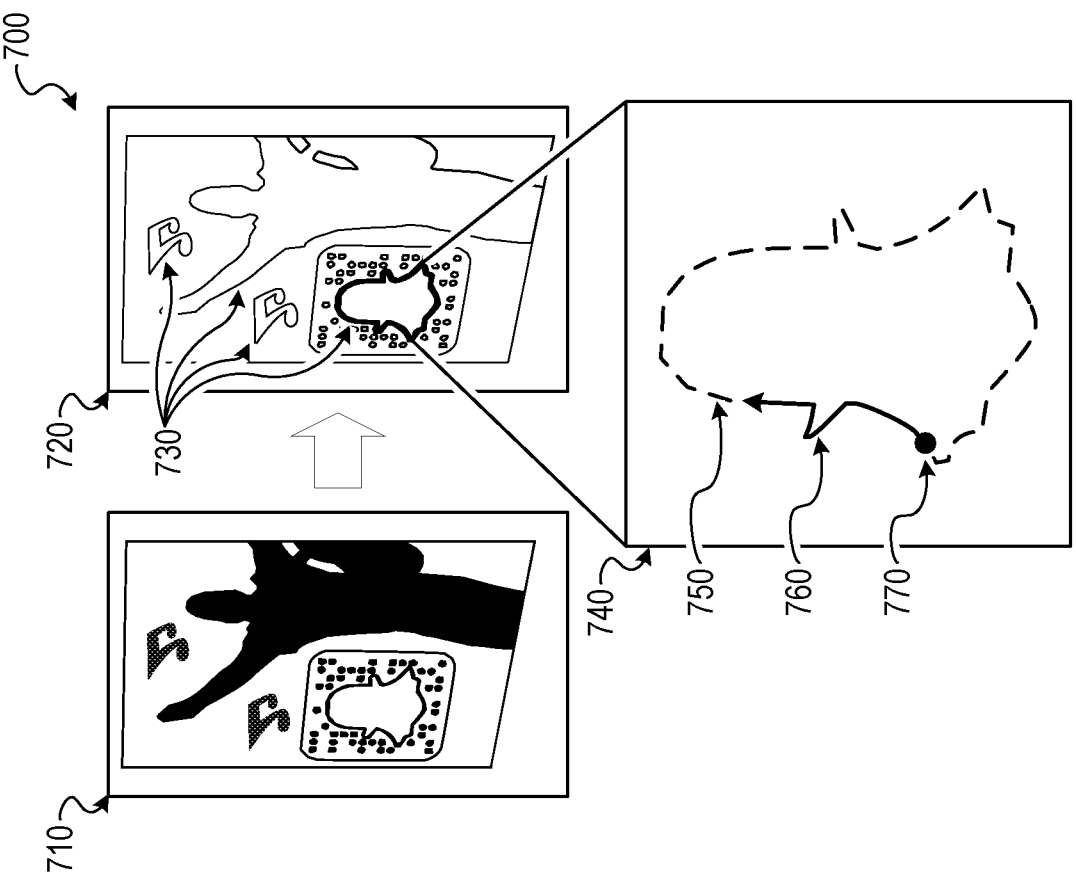
FIG. 7 is a diagram illustrating an example of identifying the optical barcode using the custom functional pattern, according to some example embodiments.

FIG. 5 is a flow diagram illustrating an example method 500 for an optical barcode (e.g., the optical barcode 406 of FIG. 4) employing a custom functional pattern. The operations of the method 500 can be performed by components of the custom pattern system 160, and are so described below for the purposes of illustration.

At operation 510, the communication module 210 receives image data of an image from a user device. For example, the communication module 210 receives the image data from an optical sensor (e.g., a camera sensor) of a smart phone of the user (e.g., client device 110 or user device 414). In various embodiments, the image data from the user device (e.g., client device 110 or user device 414) is received in response to a user-initiated image capture, a periodic monitoring of image data being detected by the optical sensor of the user device, or a combination thereof. In some embodiments, the image data represents an image or video being captured by the user device in substantially real time (e.g., a live image feed from a camera sensor of a smart phone). In other embodiments, the image data represents an image captured by the user device, or another device and stored on the user device, from a time in the past (e.g., a still image or video stored on the user device or downloaded from a social networking service). In embodiments where the image data comprises video image data, the custom pattern system 160 can analyze individual frames of the video or a combination of multiple frames of the video to detect and decode the optical barcode. A portion of the image data can include data representing an optical barcode employing a custom graphic, custom symbol, or specific graphic for a particular functional pattern (e.g., a finder pattern or alignment pattern).

In some scenarios, the image data includes extraneous or irrelevant data along with the data pertaining to the optical barcode (e.g., an image of an optical barcode includes a background that is not pertinent to decoding the optical barcode). In a specific example, the optical sensor of the user device captures an image of a movie poster that includes a particular optical barcode. The image of the movie poster can include the particular optical barcode along with irrelevant portions of the movie poster or background that surrounds the particular optical barcode.

At operation 520, the finder module 230 extracts a candidate shape feature or candidate characteristic of the image from the image data. The candidate shape feature can be indicative of an identification of the custom graphic (e.g., include certain traits or characteristics that indicate the custom graphic). For example, the finder module 230 performs an edge detection technique, or another image processing technique, to identify shape features such as contour lines or localized concentrations of color or shading of the image. In some embodiments, the finder module 230 extracts multiple candidate shape features from the image data. In some embodiments, the candidate shape feature includes various shape feature data such as a position of the candidate shape feature relative to a boundary of the image, a brightness of the candidate shape feature relative to the image, an average color of the candidate shape feature, and so forth.

In further example embodiments, the finder module 230 generates a low resolution copy of the image. The finder module 230 can perform various image processing on the low resolution copy of the image, such as a blur (e.g., a. Gaussian blur function or another blur function) and a thresholding, to generate a modified low resolution image. The thresholding image process can include adjusting lighter colors (e.g., as determined by a threshold or threshold range) of the low resolution copy of the image to a white color and darker colors (e.g., as determined by a threshold or threshold range) of the low resolution copy of the image to a black color. The finder module 230 can then extract candidate shape features from the modified low resolution image to improve detection of the custom graphic in the image and improve computational efficiency of identifying the custom graphic in the image.

In still further example embodiments, the finder module 230 generates a high resolution copy of a portion of the image. For instance, the finder module 230 can generate the high resolution copy of a particular portion of the image corresponding to the extracted candidate shape feature. The finder module 230, the alignment module 240, or the decoder module 250 can use the high resolution copy for subsequent analysis, as described below, to improve detection, alignment, and decoding results.

At operation 530, the finder module 230 determines that the candidate shape feature satisfies one or more shape feature criteria or rules. For instance, if a particular shape feature is a contour line, the finder module 230 can determine whether the contour line is an enclosed line that encircles a portion of the image. Consistent with some embodiments, the shape feature rule filters out irrelevant or extraneous features. Particular shape feature rules can be directed to or purposed for various objectives. For example, a particular shape feature rule can be purposed to filter out candidate shape features with a low probability of being the custom graphic. In this example, the particular shape feature rule can be specific to the custom graphic. In other examples, some shape feature rules can be purposed to filter out candidate shape features that are unlikely to be associated with the optical barcode. In these examples, the shape feature rule is not necessarily specific to the custom graphic.

At operation 540, in response to the candidate shape feature satisfying the shape feature rule, the finder module 230 identifies the custom graphic or custom symbol in the image by comparing the candidate shape feature with a reference shape feature of the custom graphic or custom symbol. For example, the finder module 230 can compare an area or size of the candidate shape feature with a reference area or size of the reference shape feature. In this example, the finder module 230 identifies the custom graphic based on a match or near match (e.g., a percentage match above a threshold) between the candidate shape feature and the reference shape feature. In this way, the finder module 230 uses the custom graphic, or at least a portion of the custom graphic, as a finder pattern to identify the presence of the optical barcode within a portion of the image.

In some embodiments, the finder module 230 extracts multiple candidate shape features from the image data. In these embodiments, the finder module 230 scores each candidate shape feature and ranks the multiple candidate shape features according to respective scores. For example, the finder module 230 determines a shape feature score for respective candidate shape features based on a count, or weighted count, of shape feature rules the respective candidate shape feature satisfies. The finder module 230 can iterate through the ranked candidate shape features starting with the highest scoring candidate shape feature and perform further analysis (e.g., comparing the candidate shape feature to a reference shape feature) to determine that the candidate shape feature is the custom graphic.

In some embodiments, the reference shape feature is predetermined, and in other embodiments, the reference shape feature is dynamically determined. For instance, the finder module 230 can dynamically determine the reference shape feature by analyzing a reference image of the custom graphic. For example, the finder module 230 can perform analysis techniques similar to those for analyzing the image data on the reference image such as calculating the reference area value for a particular feature or characteristic of the reference image. In these embodiments, the finder module 230 dynamically determining the reference shape feature allows for dynamic use of a particular custom graphic as a functional pattern in an optical barcode. For instance, the custom pattern system 160 can be provided (e.g., received at the communication module 210) data representing the reference image or data representing the reference features when the method 500 is performed. In this way, the custom functional patterns do not necessarily have to be fixed prior to performing the method 500.

In further example embodiments, the finder module 230 searches for multiple custom graphics in the image data of the image (e.g., where multiple versions or different custom graphics are employed as functional patterns). In a specific example, the custom graphic can comprise a first company logo and the company may change logos to a second company logo. The custom pattern system 160 can be operable to use the first company logo as a finder pattern and the second company logo as a finder pattern and the custom pattern system 160 can search for each logo when performing the method 500.

In further example embodiments, the finder module 230 identifies the custom graphic in the image in conjunction with other candidate shape features extracted from the image data. For example, the finder module 230 can search for both the custom graphic (e.g., a logo) and an outer box (e.g., the outer box 325) surrounding the custom graphic. In these embodiments, the finder module 230 identifies a combination of the custom graphic and one or more additional candidate shape features extracted from the image data.

At operation 550, in response to identifying the custom graphic, the alignment module 240 extracts a spatial attribute, geometry attribute, or spatial property of the custom graphic or custom symbol in the image from the image data. For example, the alignment module 240 extracts a position, scale, or orientation of the custom graphic from the image data. In various example embodiments, the spatial attribute is indicative of an orientation of the custom graphic in the image. The alignment module 240 or the decoder module 250 can use the spatial attribute to facilitate decoding the optical barcode.

In further embodiments, the alignment module 240 extracts a spatial attribute, geometry attribute, or spatial property of another candidate shape feature extracted from the image data of the image. For example, the alignment module 240 extracts a spatial attribute of the outer box (e.g., the outer box 325 of FIG. 3A) surrounding the custom graphic (e.g., the custom graphic 310) and the markings that encode data. It will be noted that throughout the discussion to follow, the alignment module 240 and the decoder module 250 can use the spatial attribute of the outer box in a same or similar way as the spatial attribute of the custom graphic to determine an alignment of the optical barcode used to facilitate decoding. For example, the alignment module 240 or the decoder module 250 can use the spatial attributes of the outer box to generate a transformed image of the image used to decode the data encoded in the image.

At operation 560, the decoder module 250 decodes data encoded in a portion of the image from the image data using the spatial attribute of the custom graphic in the image. For instance, the decoder module 250 can perform an image transform using the spatial attributes (e.g., a de-skew, a rotation, a scale, or another type of image transform) to improve detectability or readability of data encoded in a portion of the image. In an example embodiment, the decoder module 250 decodes the data encoded in the portion of the image by detecting marking (e.g., dots, squares, or another marking) indicative of data included in the image. In this way, the decoder module 250 uses the custom graphic, or at least a portion of the custom graphic, as an alignment pattern to facilitate decoding the optical barcode. In various embodiments, the decoder module 250 employs a Reed-Solomon error correction scheme (or other error correction scheme) to decode data encoded in the image. The Reed-Solomon error correction scheme (or other error correction scheme) allows for a successful decoding of the data encoded in the image with a certain percentage of data encoded in the image being corrupt, damaged, or incorrectly decoded. In further embodiments, the decoder module 250 uses a small checksum to verify that the value decoded from the image data is a value that includes real data rather than just random data (e.g., random bits).

In further example embodiments, the decoder module 250 rejects certain results of the decoded data (e.g., results of data decoded from the image data known to be invalid as specified by an administrator of the custom pattern system 160). For example, the decoder module 250 can reject decoded data that includes all zeros, all ones, or another specified result even though the decoded data passed other data integrity tests (e.g., error correction and checksumming). For example, this can occur when the custom pattern system 160 scans the custom graphic without any associated markings that indicate data (e.g., where the custom graphic is a logo, simply scanning the logo may yield all zeros in the decoded data and may be rejected by the decoder module 250). In a specific example, scanning the icon associated with social messaging app 1908, shown below in FIG. 19, would likely yield data with all zeros and the decoder module 250 would reject the scan.

Figure 6:
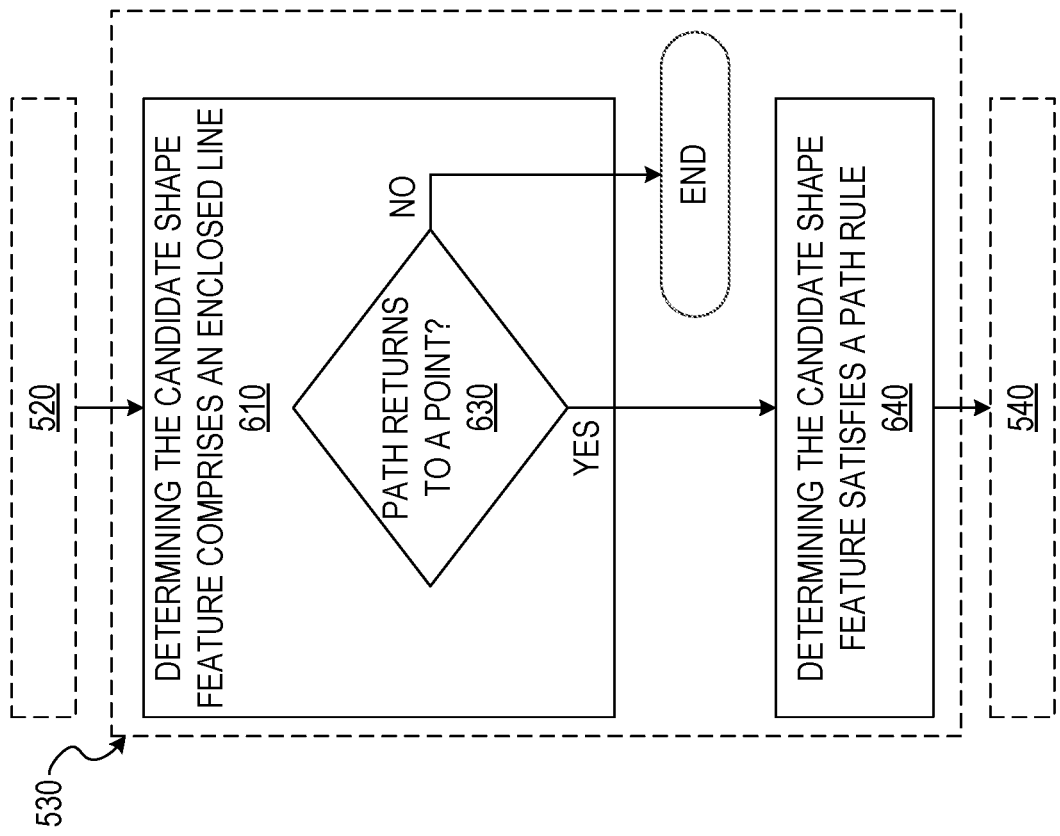
FIG. 6 is a flow diagram illustrating further example operations identifying the optical barcode using the custom functional pattern, according to some example embodiments.

FIG. 6 is a flow diagram illustrating further example operations for identifying the optical barcode (e.g., the optical barcode 406) using the custom functional pattern. At operation 530, the finder module 230 determines that the candidate shape feature satisfies the shape feature rule. In some embodiments, the operation 530 includes the operations of FIG. 6.

At operation 610, the finder module 230 determines that the candidate shape feature comprises an enclosed line from the image data. That is to say, the shape feature rule comprises a path rule and the finder module 230 determines that the candidate shape feature satisfies the path rule. The finder module 230 can employ a variety of techniques to determine that the candidate shape feature satisfies the path rule.

At operation 630, the finder module 230 determines whether the candidate shape feature is an enclosed line by determining that the candidate shape feature encircles a portion of the image by having a path that starts at a particular point and returns to the same particular point. In an example embodiment, if the candidate shape feature does not satisfy the path rule (indicated by "no" in FIG. 6), no further analysis of the candidate shape feature is performed and the finder module 230 analyzes another candidate shape feature or performs no further operations. Alternatively, at operation 640, if the tinder module 230 determines that the candidate shape feature satisfies the path rule (indicated by "yes" in FIG. 6), the subsequent operations of the method 500 are performed.

To illustrate the concepts of FIG. 6, HG. 7 is a diagram 700 illustrating an example of identifying the optical barcode using the custom functional pattern. In the diagram 700, the image 710 is an example image that is received or accessed from the user device (e.g., the user device 414). The image 720 is an example image portraying example candidate shape features 730. For instance, the finder module 230 performs an edge detection image processing on the image 710 to derive the image 720. From the image 720, the finder module 230 identifies the candidate shape features 730.

Callout 740 shows a particular candidate shape feature of the candidate shape features 730. The callout 740 shows a contour line 750 (illustrated as a dotted line) of the particular candidate shape feature, a path 760, and a point 770 of the particular candidate shape feature. In the callout 740, the finder module 230 determines that the path rule is met if the path 760 that starts at the point 770 can follow the contour line 750 and return to the point 770. In the diagram 700, the particular candidate shape feature shown in the callout 740 does satisfy the path rule since the path 760 can follow the contour line 750 and return to the point 770, FIG. 8 is a flow diagram illustrating further example operations for identifying the optical barcode using the custom functional pattern. At operation 530, the finder module 230 determines that the candidate shape feature satisfies the shape feature rule. In some embodiments, the operation 530 includes the operations of FIG. 8.

At operation 810, the finder module 230 calculates an area value or size approximation of the candidate shape feature. For example, the finder module 230 uses a proxy shape such as a polygon (e.g., a square, a rectangle, or a quadrilateral) or a non-polygonal shape (e.g., an ellipse) to approximate the shape of the candidate shape feature. The finder module 230 fits or nearly fits the proxy shape to the outer edges or outer perimeter of the candidate shape feature so that the proxy shape is representative of an area of the candidate shape feature. Subsequently, the finder module 230 calculates the area value of the proxy shape to determine the area value or size approximation of the candidate shape feature. In some embodiments, the finder module 230 employs such a technique (e.g., polygonal area approximation) to avoid a computationally expensive area calculation of the candidate shape feature in situations where the candidate shape feature is likely to be complex in shape (e.g., an area calculation for a non-uniform or irregular shaped feature is typically more computationally expensive). In some embodiments, other techniques such as pixel-based counting can be employed to determine the area value.

At operation 820, the tinder module 230 determines an area score or size score of the candidate shape feature. The finder module 230 determines the area score by comparing the area value of the candidate shape feature with a reference area value. In some embodiments, the reference area value comprises an area value of a corresponding proxy shape fitted to a reference image of the custom graphic (e.g., the area value of a proxy shape fitted to the ghost logo from a front view perspective). In other embodiments, the reference area value comprises the area value of the custom graphic (e.g., the area value of the ghost logo). The finder module 230 calculates the area score, for example, by determining a match percentage between the candidate shape feature area value and the reference area value. The finder module 230 can employ a wide variety of other schemes and techniques to calculate the area score.

At operation 830, the finder module 230 determines whether the area score exceeds a threshold. The threshold can be predefined or dynamically determined (e.g., statistically determined based on a rolling historical average of scans).

At operation 840, based on the area score exceeding the threshold (indicated by "yes" in FIG. 8), the finder module 230 determines that the candidate shape feature satisfies the area rule and proceeds to subsequent operations. In another example embodiment, the finder module 230 compares the area score to an area range to satisfy the area rule (e.g., greater than a particular value and less than a particular value). If the area score does not exceed the threshold (indicated by "no" in FIG. 8), then the finder module 230 analyzes another candidate shape feature or no further operations are performed, according to an example embodiment. In some example embodiments, the finder module 230 uses the determination of whether the candidate shape feature satisfies the shape feature rules as a filter (e.g., to remove or skip candidate shape features that are unlikely to be the custom graphic) to identify candidate shape features to be further analyzed in the process of identifying the custom graphic in the image.

To further illustrate the concepts of FIG. 8, FIG. 9 is a diagram 900 illustrating an example of identifying the optical barcode using the custom functional pattern. In the diagram 900, image 902 is an example image that is received from the user device. Callout 904 shows the spatial orientation of the image 902. In this example, the image 902 is portrayed and being seen from a front right perspective. The image 902 includes optical barcode 906. In this example, the optical barcode 906 employs the custom graphic as a functional pattern.

Callout 908 shows an enlarged portion of the image 902 that includes the candidate shape feature being analyzed by the finder module 230 to identify the custom graphic. In the callout 908, the polygon 910 (e.g., a quadrilateral) is shown fitted to a perimeter of the candidate shape feature. Area value 912 is the area of the polygon 910.

Callout 914 shows a reference image of the custom graphic. Callout 916 shows the spatial orientation of the reference image. In this example, the reference image is shown from the front view perspective. Polygon 918 is shown fitted to a perimeter of the reference image. Reference area value 920 is the area of the polygon 918. Although FIG. 9 shows polygons 910 and 918 as quadrilaterals, the finder module 230 can employ other shapes such as a square or a shape that follows or traces a contour of the candidate shape feature (e.g., an n-sided polygon or smooth fitted shape that follows contour points of the candidate shape feature).

The finder module 230 compares the area value 912 with the reference area value 920 to determine that the candidate shape feature satisfies the area rule. Another candidate shape feature of the image 902, such as one of the musical notes of the image 902, would not have an area value that is similar to the reference area value and therefore would not satisfy the area rule. In this way, the finder module 230 can quickly remove or skip certain candidate shape features that are unlikely to be identified as the custom graphic.

Figure 10:
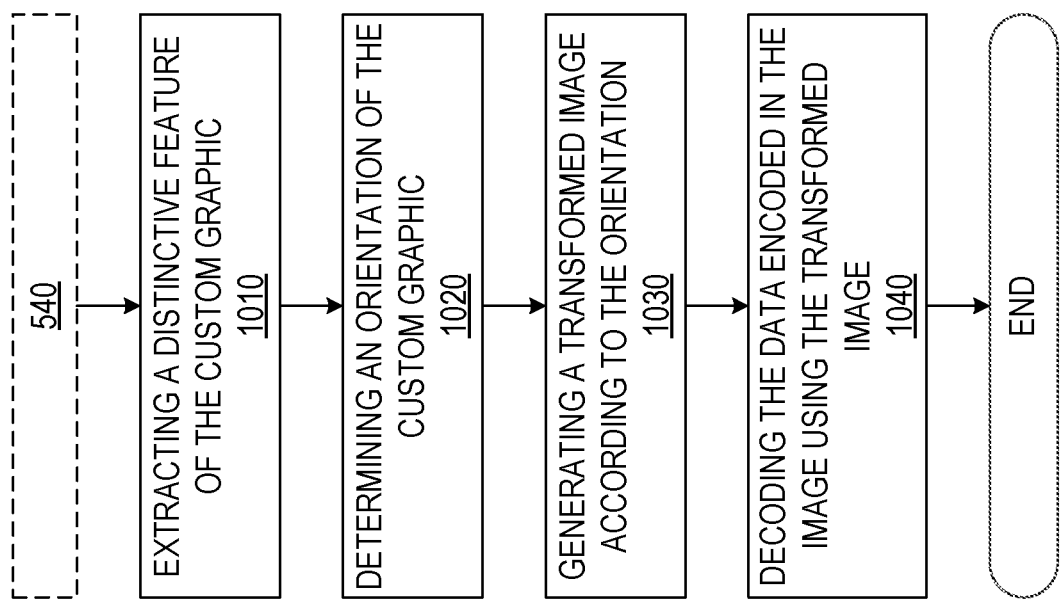
FIG. 10 is a flow diagram illustrating further example operations for decoding the optical barcode using the custom functional pattern, according to some example embodiments.

FIG. 10 is a flow diagram illustrating further example operations for decoding the optical barcode using the custom functional pattern. At the operation 540, the finder module 230 identifies the custom graphic in the image by comparing the candidate shape feature with a reference shape feature of the custom graphic. Subsequent to the operation 540, the operations of FIG. 10 are performed in some example embodiments.

At operation 1010, the alignment module 240 extracts a distinctive feature of the custom graphic from the image data where the distinctive feature is indicative of an alignment of the custom graphic (e.g., a particular asymmetry of the custom graphic that can be used to determine an orientation of the custom graphic). For example, the distinctive feature can comprise a distinctive point of the custom graphic, a distinctive curve, a particular asymmetry, a particular non-uniformity, or another characteristic of the custom graphic.

At operation 1020, the alignment module 240 determines an orientation of the custom graphic in the image by comparing the distinctive feature with a reference distinctive feature of the custom graphic. For example, the alignment module 240 maps the extracted distinctive feature of the custom graphic to a reference distinctive feature to determine spatial differences between the distinctive features. In this way, the alignment module 240 can determine an alignment of the custom graphic as compared to a reference image of the custom graphic based on the determined spatial differences.

At operation 1030, the alignment module 240 generates a transformed image by transforming the image according to the orientation of the custom graphic. For instance, the alignment module 240 can rotate, de-skew, scale, or otherwise spatially transform the image to allow for a more accurate decoding of the data in the image.

At operation 1040, the decoder module 250 decodes the data encoded in the image using the orientation and a position of the custom graphic in the image. For example, the decoder module 250 decodes the data encoded in the image from the transformed image. In a specific scenario, the image is transformed to a front view to increase visibility and uniformity of marks in the image that represent data encoded in the image.

Figure 11:
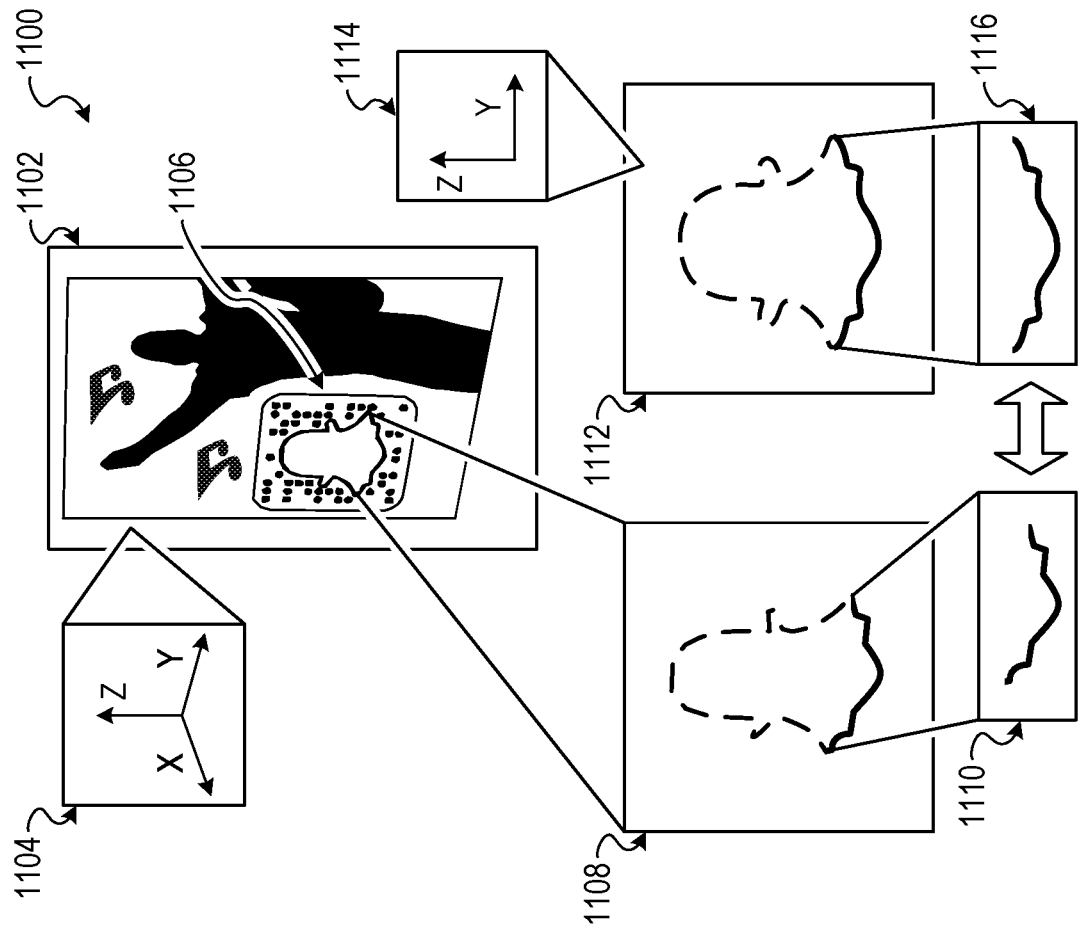
FIG. 11 is a diagram illustrating an example of decoding the optical barcode using the custom functional pattern, according to some example embodiments.

To assist in understanding the disclosure of FIG. 10, FIG. 11 is a diagram 1100 illustrating an example of decoding the optical barcode using the custom functional pattern. In the diagram 1100, similar to the FIG. 9 described above, image 1102 is an example image that is received from the user device. In this example, the image 1102 is portrayed and being seen from a front right perspective. The image 1102 includes optical barcode 1106. In this example, the optical barcode 1106 employs the custom graphic as a functional pattern.

Callout 1108 shows an enlarged portion of the image 1102 that includes the candidate shape feature being analyzed by the alignment module 240. Callout 1110 shows an enlarged portion of the callout 1108 showing a distinctive feature of the candidate shape feature.

Callout 1112 shows a reference image of the custom graphic. Callout 1114 shows the spatial orientation of the reference image. In this example, the reference image is shown from the front view perspective. Callout 1116 shows an enlarged portion of the callout 1112 showing a reference distinctive feature of the reference image.

The alignment module 240 compares the distinctive feature and the reference distinctive feature to determine an alignment including an orientation, scale, or position. For example, if the image that includes the custom graphic is shown from the front perspective, the distinctive feature of the custom graphic in the image should match the reference distinctive feature. The alignment module 240 can determine perspective changes based on a mismatch between the distinctive feature and the reference distinctive feature. The alignment module 240 uses the mismatch to infer or determine a perspective of the image or other spatial attributes of the image that can be utilized by the decoder module 250 to more accurately decode data from the image.

FIGS. 12A, 12B, and 12C are diagrams illustrating various image transformations used to facilitate decoding the optical barcode using the custom functional pattern. In an example embodiment, the alignment module 240 or the decoder module 250 performs an image transformation such as a rotation as shown by a transition between example optical barcode 1200 and 1202. In other embodiments, the alignment module 240 or the decoder module 250 performs a de-skewing, scale transformation, or another type of image transformation. In further example embodiments, the alignment module 240 or the decoder module 250 performs other image transformations such as a color inversion as shown by a transition between example optical barcode 1204 and 1206. The alignment module 240 or the decoder module 250 can perform other image transformation not shown such as image sharpening, noise reduction, or other image processing.

FIG. 12C illustrates an example of a technique to determine an alignment of the custom graphic. The example optical barcode 1208 is rotated slightly away from zero degrees. An ellipse 1210 can be fitted to the custom graphic to determine an alignment such as a rotation value of the optical barcode 1208. The major axis 1212 of the ellipse 1210 provides an indication of a rotation value 1214 away from zero degrees (of course, the minor axis, or another axis, may similarly be used to determine a rotation value). The alignment module 240 or the decoder module 250 can perform an image transformation to adjust for the rotation value 1214 as shown by the example optical barcode 1216 being rotated from an original orientation 1218. In this way, the alignment module 240 or the decoder module 250 can use the custom graphic to determine an alignment for the optical barcode included in the image to assist in decoding the data encoded in the image.

Figure 13:
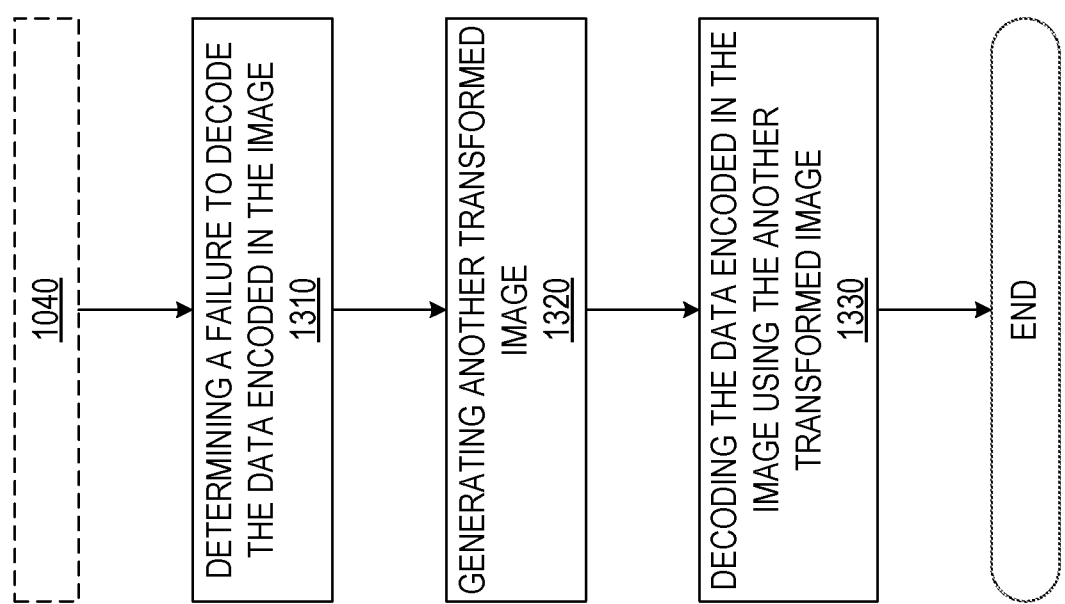
FIG. 13 is a flow diagram illustrating further example operations for decoding the optical barcode using the custom functional pattern, according to some example embodiments.

FIG. 13 is a flow diagram illustrating further example operations for decoding the optical barcode using the custom functional pattern. At operation 1040, the decoder module 250 decodes the data encoded in a portion of the image from the image data. Subsequent to the operation 1040, the operations of FIG. 13 are performed in some example embodiments.

At operation 1310, the decoder module 250 determines a failure to decode the data encoded in the portion of the image using the transformed image. For instance, if the data decoded from the image is corrupted, incomplete, or garbled, the decoder module 250 determines the failure to decode the data. In another instance, a portion of the data encoded in the image can be for the purposes of data validation. That is to say, a known or determinable value can be encoded into the data such that the data is valid if the value is decoded from the image. The decoder module 250 can employ a variety of other schemes and techniques to determine the failure to decode the data encoded in the portion of the image.

At operation 1320, the alignment module 240 generates another transformed image by transforming the image according to a different orientation of the custom graphic. For example, the alignment module 240 generates a transformed image that is rotated 180 degrees, and the decoder module 250 attempts to decode the data a second time. The alignment module 240 can perform common transforms that may resolve the failure to decode such as 90 degree rotations or another transform that has frequently resolved the failure to decode in past scans. In some embodiments, the alignment module 240 performs another analysis of the image data of the image to determine another alignment to use to use when generating another transformed image. The alignment module 240 can perform other types of image transformations by applying different types of filters (e.g., orientation, color reduction, brightness manipulation, etc.) to the custom graphic.

At operation 1330, the decoder module 250 decodes the data encoded in the portion of the image using another transformed image. The alignment module 240 and the decoder module 250 can attempt any number (e.g., a set number of attempts or an unlimited number of attempts) of iterations of alignments that ends when the data is successfully decoded from the image. In this way, the custom pattern system 160 can use the markings for self-alignment.

Figure 14:
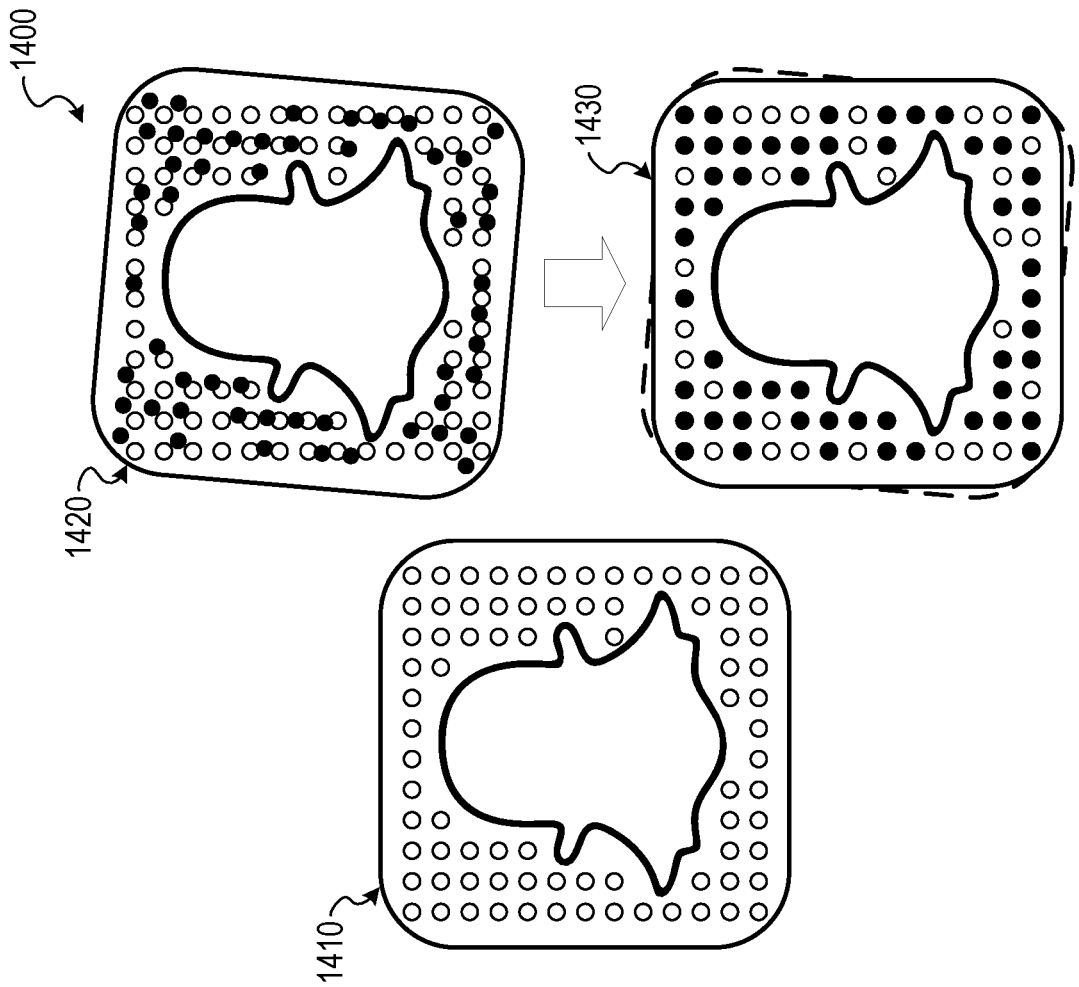
FIG. 14 is a diagram illustrating an example of decoding the optical barcode using the custom functional pattern, according to some example embodiments.

To further explain the discussion in connection with FIG. 13, FIG. 14 is a diagram 1400 illustrating an example of decoding the optical barcode using the custom functional pattern. Example optical barcode 1410 shows positions for markings with empty circles. Each empty circle of optical barcode 1410 is a position for a marker. Example optical barcode 1420 shows a misalignment between marking positions and markings. Example optical barcode 1430 shows a matching alignment between the markings and the marking positions.

Figure 16:
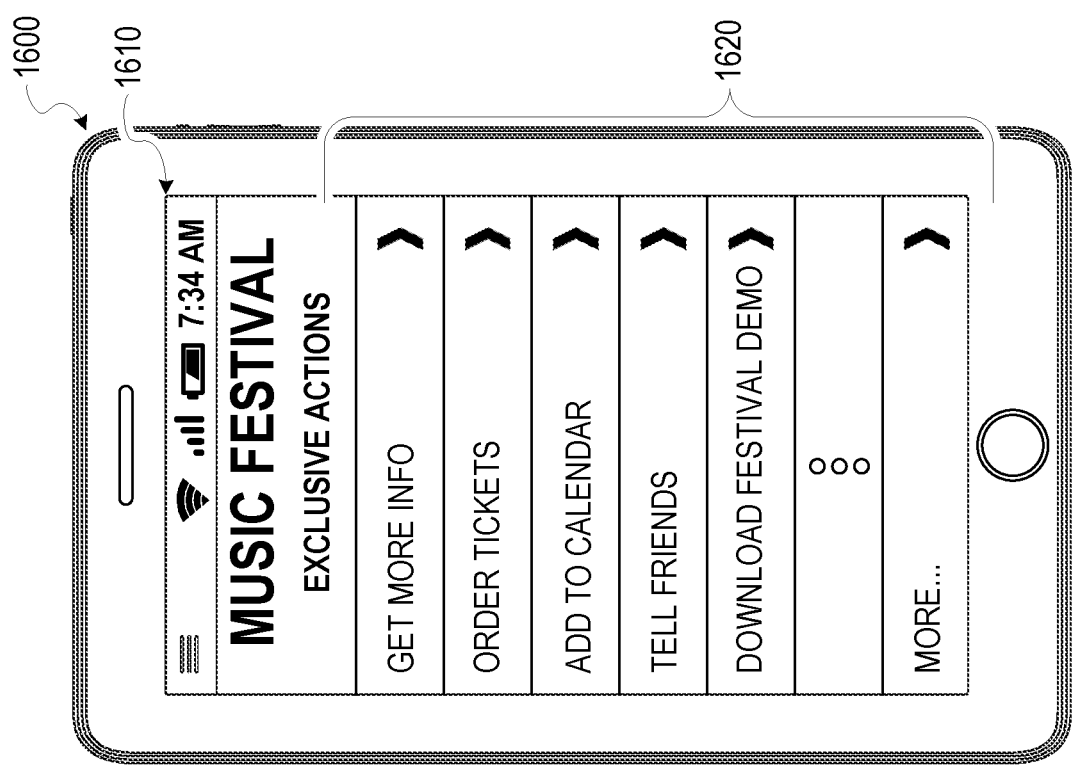
FIG. 16 is a user interface diagram depicting an example user interface for performing an action associated with the optical barcode, according to some example embodiments.
Figure 15:
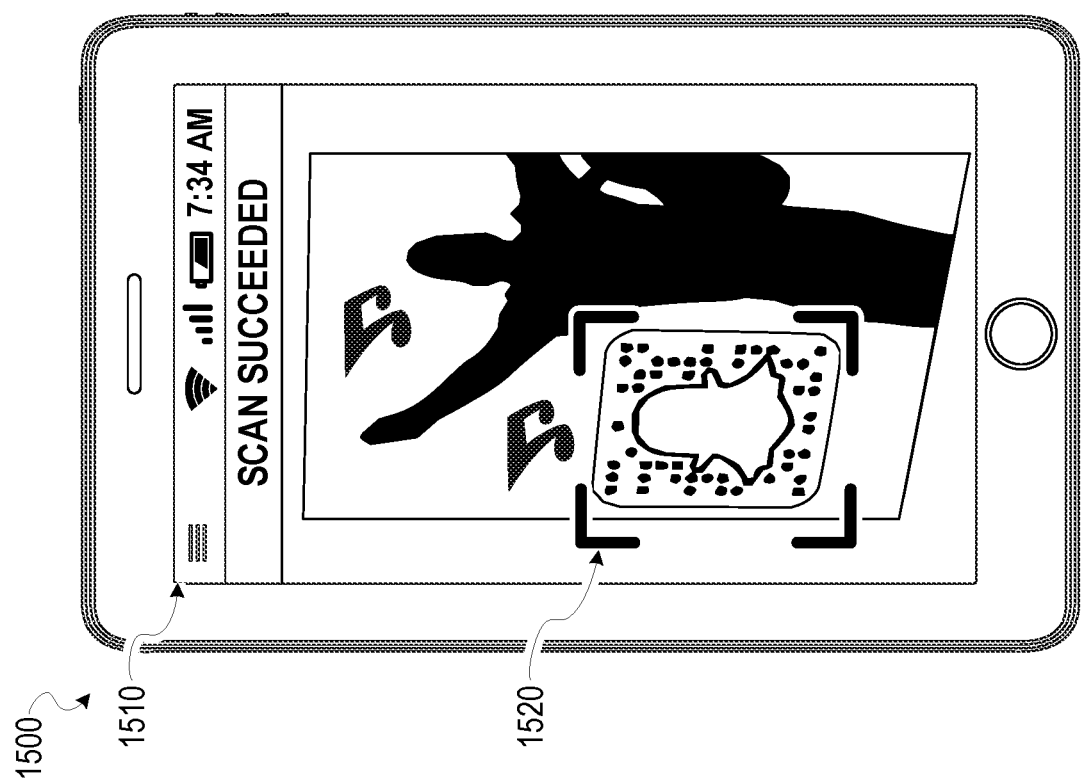
FIG. 15 is a user interface diagram depicting an example user interface for identifying the optical barcode, according to some example embodiments.

Turning now to FIGS. 15 and 16, although user interfaces described herein (e.g., FIGS. 15, 16, and 18) depict specific example user interfaces and user interface elements, these are merely non-limiting examples, and many other alternate user interfaces and user interface elements can be generated by the presentation module 220 and presented to the user. It will be noted that alternate presentations of the displays described herein include additional information, graphics, options, and so forth; other presentations include less information, or provide abridged information for easy use by the user.

FIG. 15 is a user interface diagram 1500 depicting an example user interface 1510 for identifying the optical barcode. In the user interface diagram 1500, the user interface 1510 is showing a substantially real-time image captured from a camera sensor of the user device (e.g., the client device(s) 110, the user device 414). The user interface 1510 can include graphics and user interface elements superimposed or overlaid over the substantially real-time image being displayed underneath. For instance, user interface element 1520 is a bracket that indicates identification of an optical barcode. The user interface 1510 can indicate to the user the successful, or unsuccessful, scan of a particular optical barcode.

FIG. 16 is a user interface diagram 1600 depicting an example user interface 1610 for performing an action associated with the optical barcode. In an example embodiment, the user interface 1610 is displayed after the user interface 1510 of FIG. 15 (e.g., after a successful scan, various action options associated with the scan are displayed). The user interface 1610 can include a variety of action options associated with detecting a particular optical barcode such as user interface elements 1620. In some embodiments, a particular action is automatically performed by the custom pattern system 160 in response to detecting and decoding a particular optical barcode.

In further example embodiments, the action is exclusive to software that provides scanning functionality for the optical barcode that uses the custom functional pattern (e.g., a snapcode). In some embodiments, the software that scans the optical barcode can perform certain exclusive actions without communicating with a server. This is due to the exclusive, branded nature of the custom functional pattern that is not necessarily openly decodable by other third-party software applications. The snapcode can specify such actions since it is likely that the software (e.g., a mobile computing software such as an app) that scans the branded optical barcode is associated with the branded optical barcode.

Figure 17:
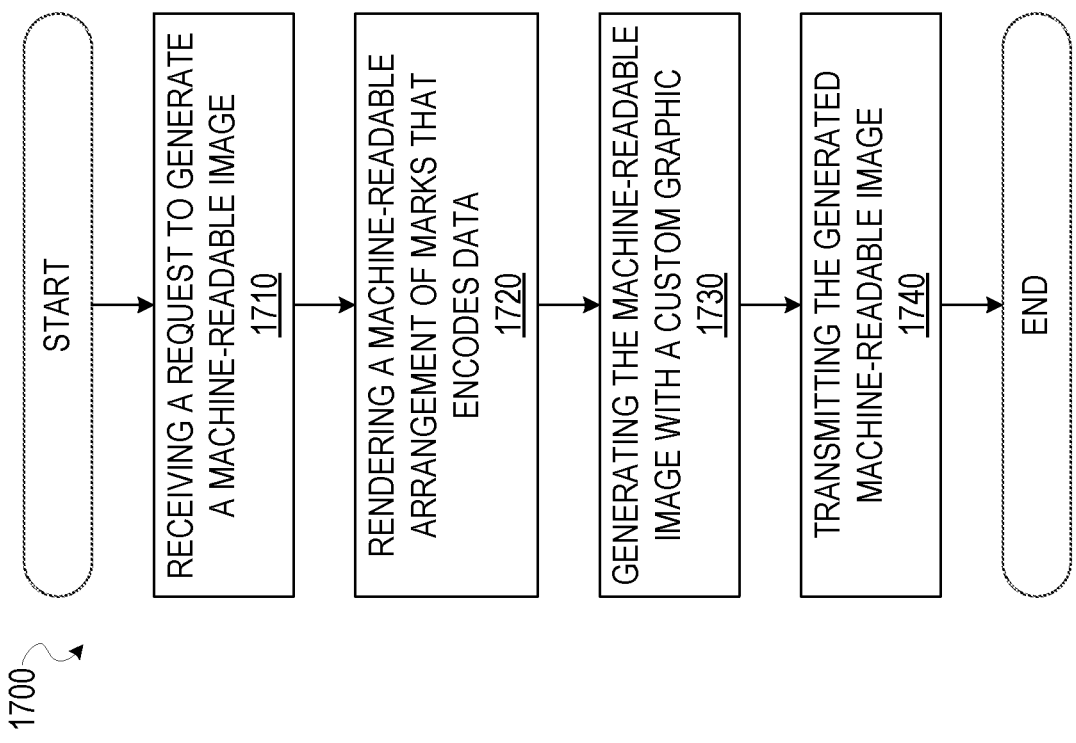
FIG. 17 is a flow diagram illustrating further example operations for generating the optical barcode using the custom functional pattern, according to some example embodiments.

FIG. 17 is a flow diagram illustrating example operations for generating the optical barcode using the custom functional pattern. The operations of the method 1700 can be performed by components of the custom pattern system 160, and are so described below for the purposes of illustration.

At operation 1710, the communication module 210 receives a request to generate a machine-readable image such as an optical barcode that uses custom functional patterns. In some embodiments, the request includes user specified data to encode into the image.

At operation 1720, the encoder module 270 renders a machine-readable arrangement of marks that encodes the user-specified data. For instance, the marks can comprise dots, squares, or other markings that are arranged in a predetermined pattern. In an example embodiment, the presence of a mark at a particular location in the arrangement is indicative of data.

At operation 1730, the encoder module 270 generates the machine-readable image by positioning the machine-readable arrangement of marks in the machine-readable image with respect to a position of the custom graphic included in the machine-readable image. For example, the custom graphic can be centered in the optical barcode or positioned elsewhere (e.g., the example optical barcodes of FIGS. 3A and 3B).

At operation 1740, the communication module 210 stores or transmits the machine-readable image. For instance, the communication module 210 can store the machine-readable image on the user device, a server, or another storage repository (either locally or remotely stored). In other instances, the communication module 210 transmits the machine-readable image to the user device, a server, or one or more other devices.

Figure 18:
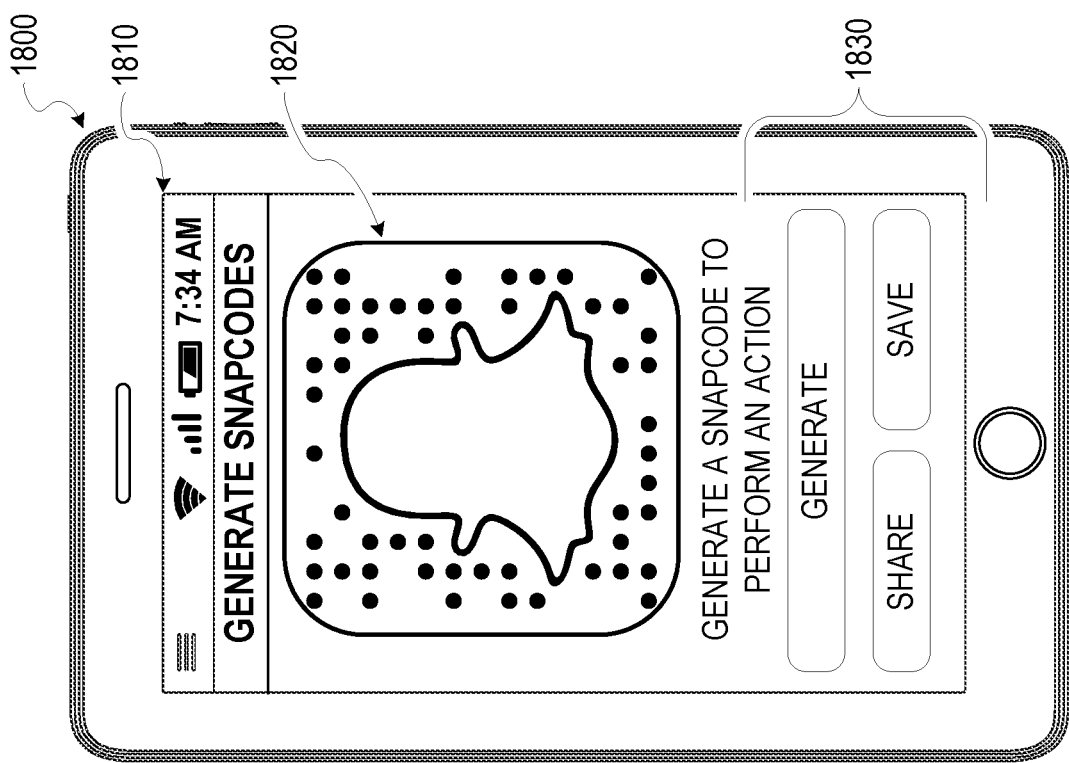
FIG. 18 is a user interface diagram depicting an example user interface for generating the optical barcode using the custom functional pattern, according to some example embodiments.

FIG. 18 is a user interface diagram 1800 depicting an example user interface 1810 for generating an optical barcode 1820 using the custom graphic. User interface elements 1830 provide the user with options for generating, sharing, or saving the machine-readable image. In some embodiments, the user interface diagram 1800 includes a user interface configured to receive user-specified data to encode into the machine-readable image (e.g., a social networking service member identifier, a website address, or another piece of information).

Figure 19:
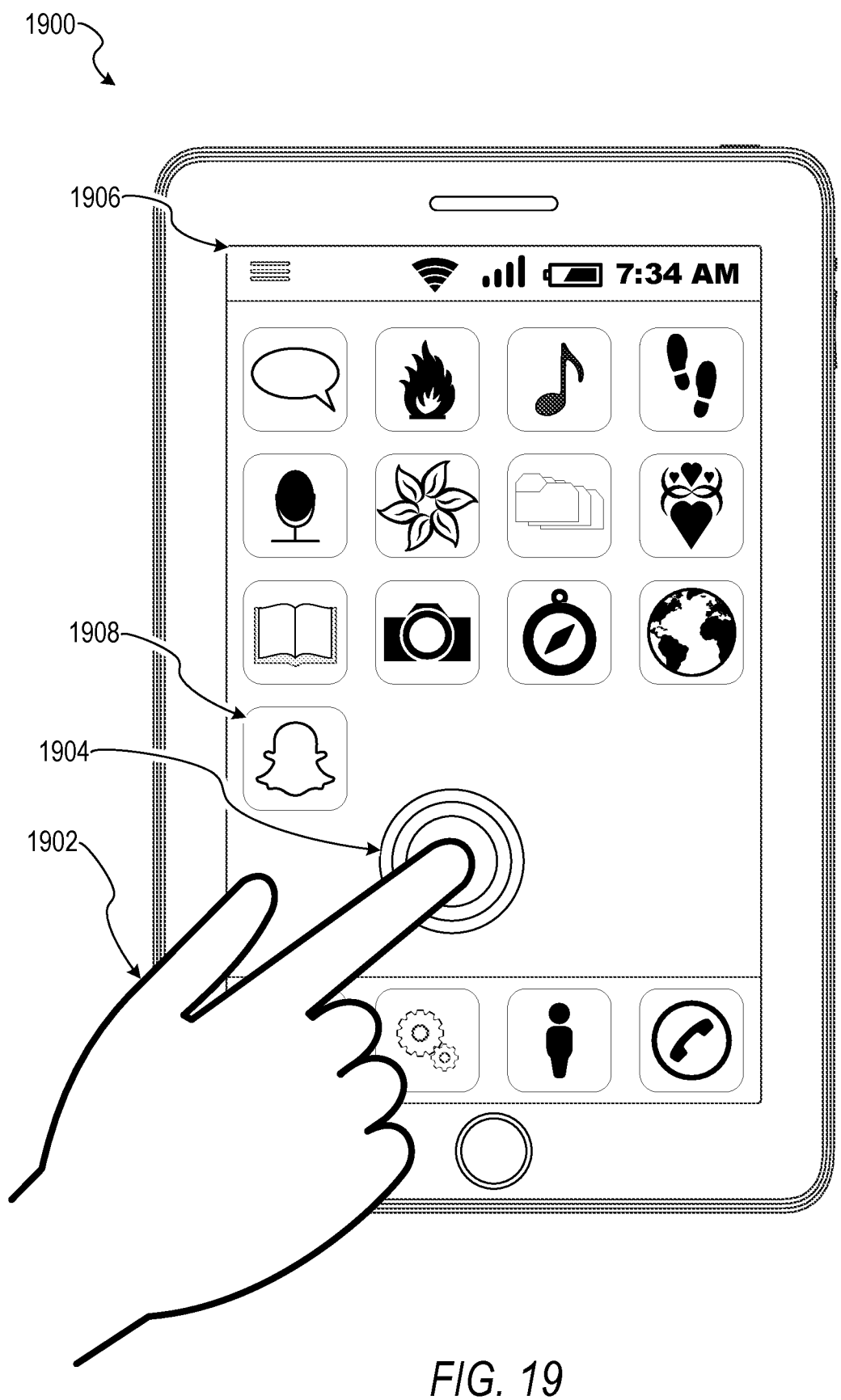
FIG. 19 is a user interface diagram depicting an example mobile device and mobile operating system interface, according to some example embodiments.

FIG. 19 illustrates an example mobile device 1900 executing a mobile operating system (e.g., IOS™, ANDROID™, WINDOWS® Phone, or other mobile operating systems), consistent with some embodiments. In one embodiment, the mobile device 1900 includes a touch screen operable to receive tactile data from a user 1902. For instance, the user 1902 may physically touch 1904 the mobile device 1900, and in response to the touch 1904, the mobile device 1900 may determine tactile data such as touch location, touch force, or gesture motion. In various example embodiments, the mobile device 1900 displays a home screen 1906 (e.g., Springboard on IOS™) operable to launch applications or otherwise manage various aspects of the mobile device 1900. In some example embodiments, the home screen 1906 provides status information such as battery life, connectivity, or other hardware statuses. The user 1902 can activate user interface elements by touching an area occupied by a respective user interface element. In this manner, the user 1902 interacts with the applications of the mobile device 1900. For example, touching the area occupied by a particular icon included in the home screen 1906 causes launching of an application corresponding to the particular icon.

Many varieties of applications (also referred to as "apps") can be executed on the mobile device 1900, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1900 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1900 includes a social messaging app 1908 such as SNAPCHAT® that, consistent with some embodiments, allows users to exchange ephemeral messages that include media content. In this example, the social messaging app 1908 can incorporate aspects of embodiments described herein.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with the figures above are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the subject technology in different contexts from the disclosure contained herein.

Figure 20:
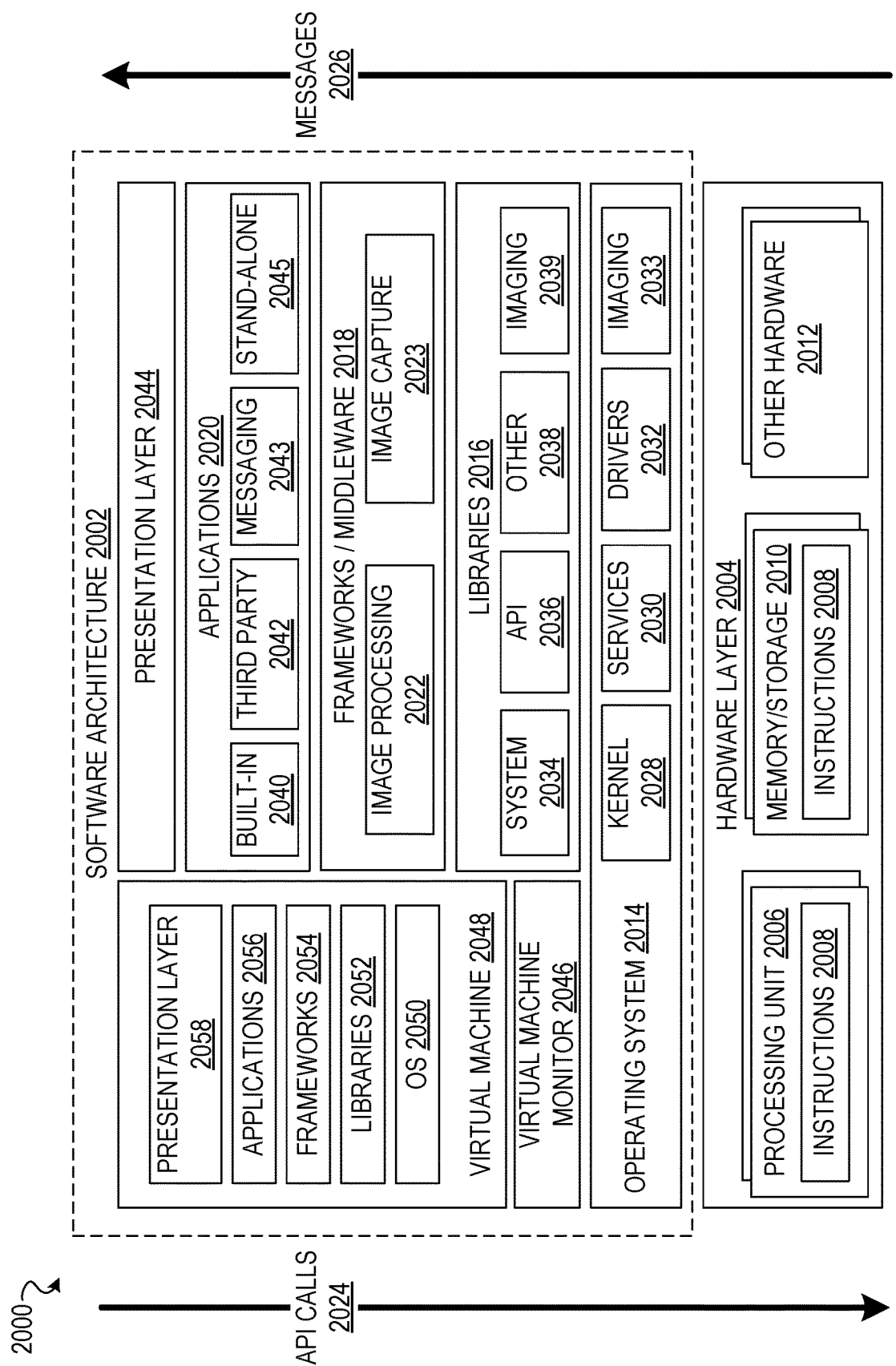
FIG. 20 is a block diagram illustrating an example of a software architecture that may be installed on a machine, according to some example embodiments.

FIG. 20 is a block diagram illustrating a system 2000 that implements a representative software architecture 2002, which may be used in conjunction with various hardware architectures herein described. FIG. 20 is merely a non-limiting example of a software architecture and it will be appreciated that many other architectures may be implemented to facilitate the functionality described herein. The software architecture 2002 may be executing on hardware such as machine 2100 of FIG. 21 that includes, among other things, processors 2110, memory/storage 2130, and I/O components 2150. A representative hardware layer 2004 is illustrated and can represent, for example, the machine 2100 of FIG. 21. The representative hardware layer 2004 comprises one or more processing units 2006 having associated executable instructions 2008. Executable instructions 2008 represent the executable instructions of the software architecture 2002, including implementation of the methods, modules and so forth in the figures and description above. Hardware layer 2004 also includes memory and storage modules 2010, which also have executable instructions 2008. Hardware layer 2004 may also comprise other hardware as indicated by 2012 which represents any other hardware of the hardware layer 2004, such as the other hardware illustrated as part of machine 2100.

In the example architecture of FIG. 20, the software architecture 2002 may be conceptualized as a stack of layers where each layer provides particular functionality. For example, the software architecture 2002 may include layers such as an operating system 2014, libraries 2016, frameworks/middleware 2018, applications 2020 and presentation layer 2044. Operationally, the applications 2020 or other components within the layers may invoke application programming interface (API) calls 2024 through the software stack and receive a response, returned values, and so forth illustrated as messages 2026 in response to the API calls 2024. The layers illustrated are representative in nature and not all software architectures have all layers. For example, some mobile or special purpose operating systems may not provide the frameworks/middleware layer 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, BLUETOOTH® drivers, flash memory drivers, serial communication drivers (e.g., Universal Serial Bus (USB) drivers), WI-FI® drivers, audio drivers, power management drivers, and so forth depending on the hardware configuration. In an example embodiment, the operating system 2014 includes an imaging service 2033 that can provide image processing services, such as hardware-accelerated image processing, or image capture services, such as low-level access to optical sensors or optical sensor data.

The libraries 2016 may provide a common infrastructure that may be utilized by the applications 2020 or other components or layers. The libraries 2016 typically provide functionality that allows other software modules to perform tasks in an easier fashion than to interface directly with the underlying operating system 2014 functionality (e.g., kernel 2028, services 2030 or drivers 2032). The libraries 2016 may include system libraries 2034 (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media format such as MPREG4, H.264, MP3, AAC, AMR, JPG, or PNG), graphics libraries (e.g., an OpenGL, framework that may be used to render 2D and 3D in a graphic content on a display), database libraries (e.g., SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules. In an example embodiment, the libraries 2016 include imaging libraries 2039 that provide image processing or image capture functionality that can be utilized by the custom pattern system 160.

The frameworks 2018 (also sometimes referred to as middleware) may provide a higher-level common infrastructure that may be utilized by the applications 2020 or other software components modules. For example, the frameworks 2018 may provide various graphic user interface (GUI) functions, high-level resource management, high-level location services, and so forth. The frameworks 2018 may provide a broad spectrum of other APIs that may be utilized by the applications 2020 or other software components modules, some of which may be specific to a particular operating system or platform. In an example embodiment, the frameworks 2018 include an image processing framework 2022 and an image capture framework 2023. The image processing framework 2022 can provide high-level support for image processing functions that can be used in aspects of the custom pattern system 160. Similarly, the image capture framework 2023 can provide high-level support for capturing images and interfacing with optical sensors.

The applications 2020 include built-in applications 2040 or third party applications 2042. Examples of representative built-in applications 2040 may include, but are not limited to, a contacts application, a browser application, a book reader application, a location application, a media application, a messaging application, or a game application. Third party applications 2042 may include any of the built-in applications 2040 as well as a broad assortment of other applications. In a specific example, the third party application 2042 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or other mobile operating systems. In this example, the third party application 2042 may invoke the API calls 2024 provided by the mobile operating system such as operating system 2014 to facilitate functionality described herein. In an example embodiment, the applications 2020 include a messaging application 2043 that includes the custom pattern system 160 as part of the application. In another embodiment, the applications 2020 include a stand-alone application 2045 that includes the custom pattern system 160.

The applications 2020 may utilize built-in operating system functions (e.g., kernel 2028, services 2030 or drivers 2032), libraries (e.g., system libraries 2034, API libraries 2036, and other libraries 2038), frameworks/middleware 2018 to create user interfaces to interact with users of the system 2000. Alternatively, or additionally, in some systems, interactions with a user may occur through a presentation layer, such as presentation layer 2044. In these systems, the application/module "logic" can be separated from the aspects of the application/module that interact with a user.

Some software architectures utilize virtual machines. In the example of FIG. 20, this is illustrated by virtual machine 2048. A virtual machine creates a software environment where applications/modules can execute as if they were executing on a hardware machine (such as the machine 2100 of FIG. 21, for example). A virtual machine is hosted by a host operating system (operating system 2014 in FIG. 20) and typically, although not always, has a virtual machine monitor 2046, which manages the operation of the virtual machine 2048 as well as the interface with the host operating system (i.e., operating system 2014). A software architecture executes within the virtual machine 2048 such as an operating system 2050, libraries 2052, frameworks/middleware 2054, applications 2056 or presentation layer 2058. These layers of software architecture executing within the virtual machine 2048 can be the same as corresponding layers previously described or may be different.

Figure 21:
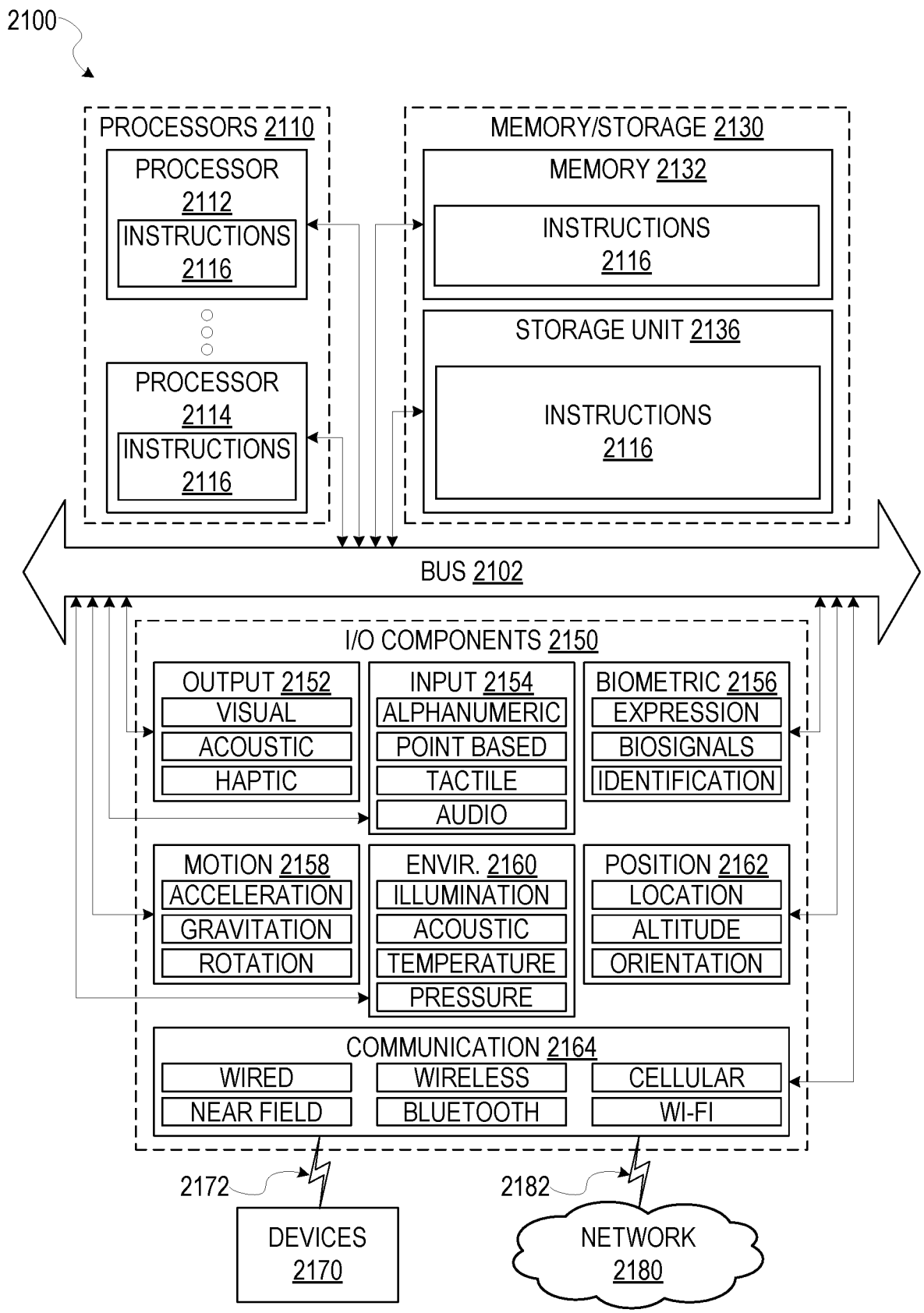
FIG. 21 is a block diagram presenting a diagrammatic representation of a machine in the form of a computer system within which a set of instructions may be executed for causing the machine to perform any of the methodologies discussed herein, according to an example embodiment.

FIG. 21 is a block diagram illustrating components of a machine 2100, according to some example embodiments, able to read instructions from a machine-readable medium (e.g., a machine-readable storage medium) and perform any one or more of the methodologies discussed herein. Specifically, FIG. 21 shows a diagrammatic representation of the machine 2100 in the example form of a computer system, within which instructions 2116 (e.g., software, a program, an application, an apples, an app, or other executable code) for causing the machine 2100 to perform any one or more of the methodologies discussed herein can be executed. For example, the instructions 2116 can cause the machine 2100 to execute the flow diagrams of FIGS. 5, 6, 8, 10, 13, and 17. Additionally, or alternatively, the instructions 2116 can implement the communication module 210, the presentation module 220, the finder module 230, the alignment module 240, the decoder module 250, the action module 260, or the encoder module 270 of FIG. 2, and so forth. The instructions 2116 transform the general, non-programmed machine into a particular machine programmed to carry out the described and illustrated functions in the manner described. In alternative embodiments, the machine 2100 operates as a standalone device or can be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by the machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 can include processors 2110, memory/storage 2130, and I/O components 2150, which can be configured to communicate with each other such as via a bus 2102. In an example embodiment, the processors 2110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RITC), another processor, or any suitable combination thereof) can include, for example, processor 2112 and processor 2114 that may execute instructions 2116. The term "processor" is intended to include multi-core processor that may comprise two or more independent processors (sometimes referred to as "cores") that can execute instructions contemporaneously. Although FIG. 21 shows multiple processors 2110, the machine 2100 may include a single processor with a single core, a single processor with multiple cores (e.g., a multi-core processor), multiple processors with a single core, multiple processors with multiples cores, or any combination thereof.

The memory/storage 2130 can include a memory 2132, such as a main memory, or other memory storage, and a storage unit 2136, both accessible to the processors 2110 such as via the bus 2102. The storage unit 2136 and memory 2132 store the instructions 2116 embodying any one or more of the methodologies or functions described herein. The instructions 2116 can also reside, completely or partially, within the memory 2132, within the storage unit 2136, within at least one of the processors 2110 (e.g., within the processor's cache memory), or any suitable combination thereof, during execution thereof by the machine 2100.

Accordingly, the memory 2132, the storage unit 2136, and the memory of the processors 2110 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by one or more processors of the machine 2100 (e.g., processors 2110), cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 can include a wide variety of components to receive input, provide output, produce output, transmit information, exchange information, capture measurements, and so on. The specific I/O components 2150 that are included in a particular machine will depend on the type of machine. For example, portable machines such as mobile phones will likely include a touch input device or other such input mechanisms, while a headless server machine will likely not include such a touch input device. It will be appreciated that the I/O components 2150 can include many other components that are not shown in FIG. 21. The I/O components 2150 are grouped according to functionality merely for simplifying the following discussion and the grouping is in no way limiting. In various example embodiments, the I/O components 2150 can include output components 2152 and input components 2154. The output components 2152 can include visual components (e.g., a display such as a plasma display panel (PDP), a light emitting diode (LEI)) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 2150 can include biometric components 2156, motion components 2158, environmental components 2160, or position components 2162 among a wide array of other components. For example, the biometric components 2156 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 can include acceleration sensor components (e.g., an accelerometer), gravitation sensor components, rotation sensor components (e.g., a gyroscope), and so forth. The environmental components 2160 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 2162 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 2150 may include communication components 2164 operable to couple the machine 2100 to a network 2180 or devices 2170 via a coupling 2182 and a coupling 2172, respectively. For example, the communication components 2164 include a network interface component or other suitable device to interface with the network 2180. In further examples, communication components 2164 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 2170 may be another machine or any of a wide variety of peripheral devices (e.g., a peripheral device coupled via a Universal Serial Bus (USB)).

Moreover, the communication components 2164 can detect identifiers or include components operable to detect identifiers. For example, the communication components 2164 can include Radio Frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 2164, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 2180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 2180 or a portion of the network 2180 may include a wireless or cellular network, and the coupling 2182 may be a Code Division Multiple Access (CDMA) connection, a Global System for Mobile communications (GSM) connection, or other type of cellular or wireless coupling. In this example, the coupling 2182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2116 can be transmitted or received over the network 2180 using a transmission medium via a network interface device (e.g., a network interface component included in the communication components 2164) and utilizing any one of a number of well-known transfer protocols (e.g., Hypertext Transfer Protocol (HTTP)). Similarly, the instructions 2116 can be transmitted or received using a transmission medium via the coupling 2172 (e.g., a peer-to-peer coupling) to devices 2170. The term "transmission medium" shall be taken to include any intangible medium that is capable of storing, encoding, or carrying the instructions 2116 for execution by the machine 2100, and includes digital or analog communications signals or other intangible medium to facilitate communication of such software.

Figure 22:
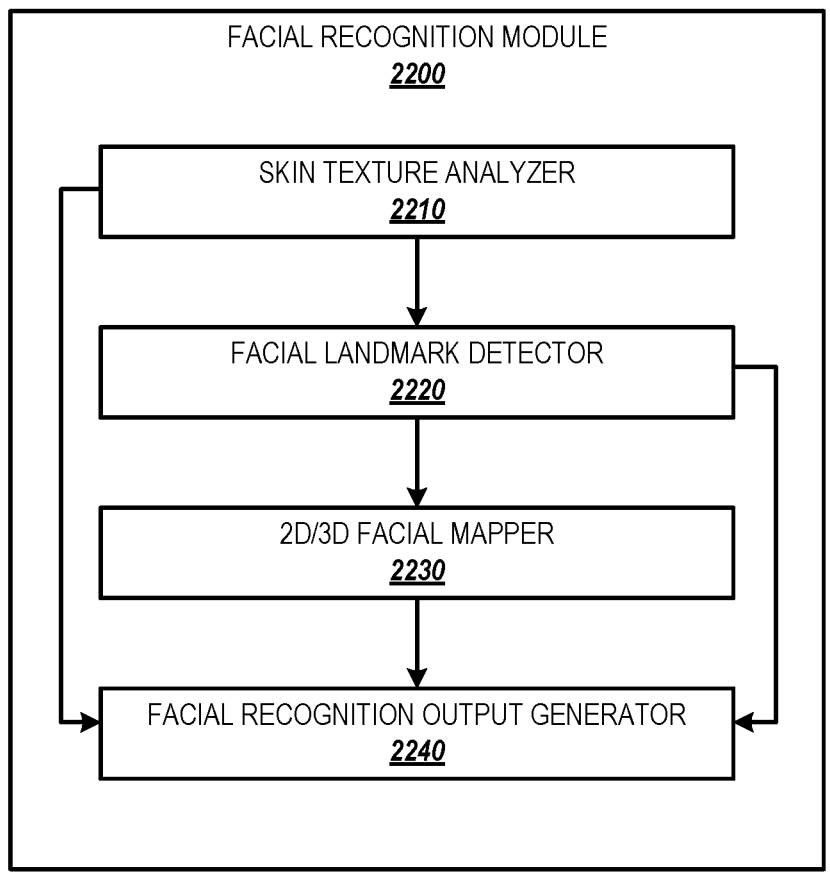
FIG. 22 is a block diagram of a facial recognition module which may reside on a client device or a server, according to some example embodiments.

FIG. 22 is a block diagram of a facial recognition module 2200 which may reside on a client device (e.g., one of the client device(s) 110) or a server (e.g., the social messaging system 130 or one of the third party server(s) 120), according to some example embodiments. The facial recognition module 2200 may receive as input an image and provide as output an indication of whether the image includes a face. The image may be any image. In some cases the image include a pattern (e.g., a facial pattern) surrounded by information encoded using dots and blank spaces. The output may be a Boolean value or an indication of the position of the face on the image. The indication of the position of the face on the image includes, according to some implementations, pixels occupied by the face an orientation of the face. As shown, the facial recognition module 2200 includes a skin texture analyzer 2210, a facial landmark detector 2220, a two-dimensional/three-dimensional (2D/3D) facial mapper 2230, and a facial recognition output generator 2340. Positions of pixels on an image may be represented with (X, Y) coordinates, where X is the distance to the right, measured in pixels, from the left edge of a rectangular image, and Y is the distance down, measured in pixels, from the top edge of the image.

The skin texture analyzer 2210 is configured to locate skin on an image. The skin may be located on the image based on color or shading. For example, the skin texture analyzer 2210 stores colors or shadings associated with skin colors or shadings of people of different races, and compares the stored colors or shadings with colors or shadings appearing on the image. The location of the skin on the image may be likely to include a face, as images of faces are more common than images of other body parts (e.g., arms or legs) including skin. The output of the skin texture analyzer 2210 includes identification of the pixels that include colors or shadings associated with skin on the image. The output of the skin texture analyzer 2210 is provided to the facial landmark detector 2220.

The facial landmark detector 2220 is configured to extract landmarks or features of a face. The landmarks or features may include the eyes, nose, mouth, hair, etc. The landmarks or features are extracted by comparing features on the image with stored examples of facial features. In some cases, machine learning is used to train a machine to recognize facial landmarks or facial features. The facial landmark detector 2220 provides the positions of pixels corresponding to the facial landmarks or features to the 2D/3D facial mapper 2230. Positions of pixels on an image may be represented with (X, Y) coordinates, where X is the distance to the right, measured in pixels, from the left edge of a rectangular image, and Y is the distance down, measured in pixels, from the top edge of the image.

The 2D/3D facial mapper 2230 is configured to generate, based on the facial landmarks provided by the facial landmark detector 2220, a map of the face, which includes the positions of the facial landmarks. The map includes an indication of the pixels (e.g., X, Y coordinates) occupied by the face and pixels occupied by each facial landmark in some cases, the map is represented as a list of pixels occupied by the face and a list of pixels occupied by each facial landmark. The generated map may be compared with expected facial positions (e.g., mouth below nose, one eye above and to the left of the nose, one eye above and to the right of the nose, etc.) to determine whether the map corresponds to a photograph or drawing/avatar of a human face. The generated map may be used to determine an upward direction of the face, for example, by drawing a first line from the middle point of the left eye to the middle point of the right eye and determining a second line perpendicular to the first line. The upward direction is the direction along the second line that goes from the mouth, to the nose, to a point on the line between the two eyes.

The facial recognition output generator 2240 is configured to determine, based on the outputs of the skin texture analyzer 2210, the facial landmark detector 2220, or the 2D/3D facial mapper 2230, whether a face exists in the image and to provide an appropriate output. The output may be a Boolean value (e.g., TRUE if a face exists, FALSE otherwise). Alternatively, the output may indicate the position of the face in the image.

As used herein, the term "configured" encompasses its plain and ordinary meaning. A computer, such as a client device or a server, may be configured to carry out operations by having the operations programmed in software into a memory that is accessible by the processor(s) of the computer. Alternatively, the computer may be configured to carry out operations by having its processor(s) hard wired to carry out the operations, FIG. 22 illustrates one example implementation of the facial recognition module 2200. Other implementations of facial recognition technology may be used in place of that illustrated in FIG. 22. For example, a thermal imager may be used in conjunction with or in place of the skin texture analyzer 2210 to determine possible positions of a face in the image. The thermal imager may determine a temperature associated with each pixel. If temperatures associated with pixels cannot be determined, the thermal imager cannot be used and other approaches to facial recognition may be applied. The thermal imager may operate based on the principle that the temperature of the human body is approximately 37 C (98.6 F), which may be different from the temperature of the surrounding environment (e.g., approximately 20 C (68 F) for an indoor scene at room temperature, or an ambient temperature generated by a thermometer or a weather reporting service). Thus, a position on the image having a temperature of 36-38 C is likely to correspond to a part of the human body, especially if the ambient temperature is below 35 C or above 40 C. If all pixels in the image are at approximately the same temperature (e.g., within 9 Fahrenheit degrees or 5 Celcius degrees of one another), the thermal imager may not be useful, and other approaches to facial recognition can be used.

Figure 23:
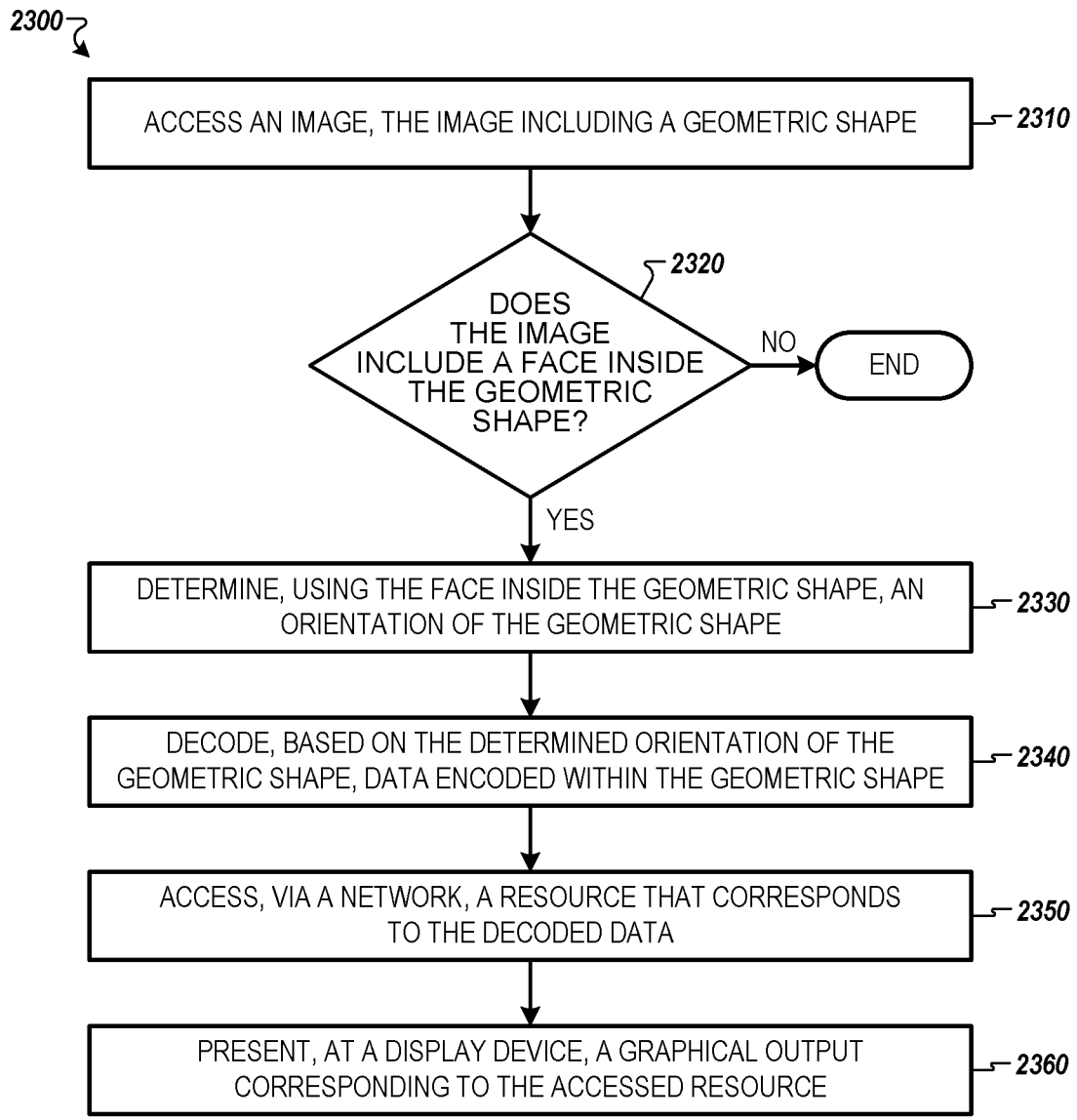
FIG. 23 is a flow diagram illustrating an example method for accessing a resource based on decoded information from an image including a face, according to some example embodiments.

FIG. 23 is a flow diagram illustrating an example method 2300 for accessing a resource based on decoded information from an image including a face, according to some example embodiments. The method 2300 may be implemented at a computer, for example, at one of the client device(s) 110.

The method 2300 begins at step 2310, where the computer accesses an image. The image includes a geometric shape, such as a square or a rectangle with rounded corners. The image may be accessed via a camera of the computer, for example, by pointing the camera at the image. Alternatively, the image may be accessed, at the computer, via a web browser, a social networking application, a messaging service, or any other application executing at the computer.

At step 2320, the computer determines whether the image includes a face inside the geometric shape, for example, by providing the image (or a portion of the image that includes the geometric shape) to the facial recognition module 2200. The face inside the geometric shape may be an avatar or a drawing of a face. Alternatively, the face inside the geometric shape may be a photograph of a human face. If the image includes the face inside the geometric shape, the method 2300 continues to step 2330. Otherwise, the method 2300 ends.

At step 2330, upon determining that the image includes the face inside the geometric shape, the computer determines, using the face inside the geometric shape, an orientation of the geometric shape. For example, if the geometric shape is a rectangle, the computer determines an upward direction of the face and sets an upward direction of the geometric shape based on an upward direction of the face and a direction of at least one side of the rectangle. According to some implementations, the set upward direction of the geometric shape is perpendicular or parallel to the side of the rectangle. According to some implementations, a ray corresponding to the set upward direction of the geometric shape and a ray corresponding to the determined upward direction of the face make an angle of less than 45 degrees. In some cases, an orientation of the face can be determined by drawing a first line between a center point of the left eye and a center point of the right eye, and drawing a second line perpendicular to the first line. The upward direction of the face is the direction, along the second line, going from the mouth to the nose to the first line between the eyes. The upward direction in the rectangle is determined such that the upward direction of the rectangle corresponds to a ray along a side of the rectangle and makes an angle of less than 45 degrees with the ray corresponding to the upward direction of the face. In some cases, a profile or semi-profile of a face is included in the image, in place of the entire face. In this case, the upward direction can be determined as a direction from the mouth (or center point of the mouth) to the eye (or center point of the eye), from the mouth (or center point of the mouth) to the nose (or center point of the nose), from the nose (or center point of the nose) to the eye (or center point of the eye), from the neck (or center point of the neck) to the hairline (or center point of the hairline), etc. As used herein, the phrase "center point," encompasses its plain and ordinary meaning. According to some examples, a center point of multiple pixels can be computed as the mean X coordinate and the mean Y coordinate of the multiple pixels.

At step 2340, the computer decodes, based on the determined orientation of the geometric shape, data encoded within the geometric shape. The decoding may be completed using the techniques described herein, for example, in conjunctions with FIGS. 3-5. Alternatively, the decoding may be complete using any other known techniques.

At step 2350, the computer accesses, via a network, a resource that corresponds to the decoded data. For example, the decoded data could be provided to a data repository that applies a hash function or table lookup (or other function or lookup) to the decoded data. The output of the function or lookup corresponds to the resource to be accessed via the network. The resource may be, for example, a link for creating an "add friend" request for a new contact in a messaging application. In one example, the face in the image is the new contact's face or the face of an avatar of the new contact.

At step 2360, the computer presents, at a display device, a graphical output corresponding to the accessed resource. For example, the graphical output includes an interface for performing actions, as shown, for example, in FIG. 16 at the user interface 1610 having user interface elements 1620. After step 2360, the method 2300 ends.

Figure 24:
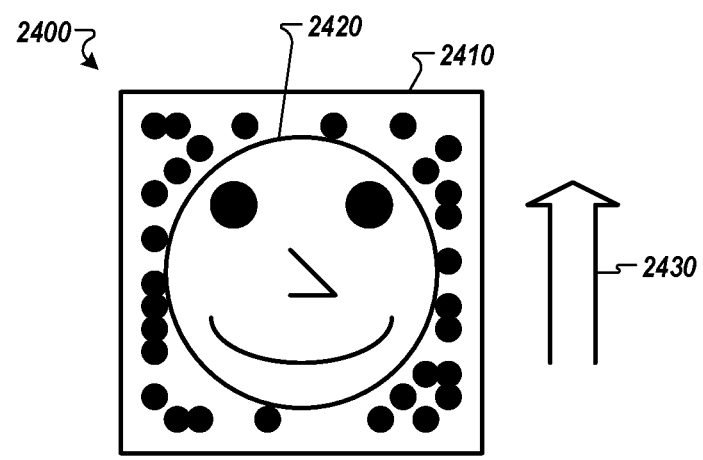
FIG. 24 is a diagram illustrating an example optical barcode including a face, according to some example embodiments.

FIG. 24 is a diagram illustrating an example optical barcode 2400 including a face, according to some example embodiments. As shown, the optical barcode 2400 includes a geometric shape 2410 with a face 2420 inside the geometric shape 2140. The geometric shape 2410 is shown to be a square with sharp corners. In alternative embodiments, the geometric shape 2410 may be a square or a rectangle with rounded corners. As illustrated, the face 2420 includes eyes, a nose, and a mouth. The eyes, nose, and mouth of the face 2420 are used, by a computer accessing the optical barcode 2400, to determine an upward direction in the geometric shape 2410. The determined upward direction is indicated by the arrow 2430, and may correspond to a direction normal to a side of the square and within 45 degrees of a line normal to a line between the eyes of the face 2420 or within 45 degrees of a line from a midpoint of the mouth to the tip of the nose of the face 2420. The positions (e.g., occupied pixels, center points, etc.) of the facial features (e.g., eyes, nose, mouth, etc.) are indicated by the facial map generated by the 2D/3D facial mapper 2230. These positions are used to determine the upward direction indicated by the arrow 2430. Upon determining the upward direction in the geometric shape 2410, the computer decodes the information encoded by the dots, which are illustrated as being within the geometric shape 2410 and outside the face 2420. Upon decoding the information, the computer presents an output corresponding to the decoded information.

The subject technology is described herein as using facial recognition to recognize a face, and then determining an orientation using the recognized face. However, in some aspects, a full face may not be required. For example, the orientation may be determined from a close up of a single eye, or a nose without eyes and a mouth. In other examples, any image that has an orientation may be used in place of a face. For instance, an image of a car, a tree, a computer, a telephone, or anything else that has a known upward direction may be used. The upward direction can be determined based on stored intelligence that a certain feature should be above another feature in an image. For example, in an image of an eye, the eyelashes are above the eyeball. Thus, a ray from a center point of the eyeball to a center point of the eye lashes points upward. In an image of a car, the windows are above the wheels. In an image of a telephone, the numbers and text on the keypad are oriented in the same manner as text on a printed page. Specifically, in one case, an image of a human being with a blurry face or a stick figure with an empty circle in place of the face may be used.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, by one or more processors, an image that depicts an object;
   determining a first line passing through two features of the object;
   determining a second line that forms an angle relative to the first line;
   determining an orientation of the image based on the angle formed by the second line relative to the first line; and
   decoding data encoded within the image based on the determined orientation.

2. The method of claim 1, wherein the second line is perpendicular to the first line.

3. The method of claim 1, wherein the object is a face.

4. The method of claim 1, further comprising generating for display, on an electronic display, a graphical output based on the decoded data.

5. The method of claim 1, wherein the angle is less than 45 degrees.

6. The method of claim 1, wherein the two features comprise a midpoint of a mouth of a face and a tip of a nose of the face.

7. The method of claim 1, further comprising detecting the object based on a temperature associated with pixels in a first portion of the image corresponding to a specified range.

8. The method of claim 1, further comprising:
   detecting eyes on a face as the two features; and
   accessing a resource based on the decoded data.

9. The method of claim 1, further comprising detecting a geometric shape within the image, wherein the object is detected in response to the detection of the geometric shape.

10. The method of claim 9, wherein the geometric shape comprises a rectangle, and wherein determining the orientation of the image comprises:
    determining an orientation of the object;
    setting an orientation of the geometric shape based on the orientation of the object and based on a direction of at least one side of the rectangle; and
    determining the orientation of the image based on the orientation of the geometric shape.

11. The method of claim 10, further comprising:
    determining that an orientation of a side of the rectangle and the second line are parallel within a predetermined angle of each other; and
    determining the orientation of the geometric shape based on the orientation of the side.

12. The method of claim 1, wherein the object comprises an avatar or a drawing of a face.

13. A non-transitory machine-readable medium comprising instructions which, when executed by one or more processors of a computing device, cause the computing device to perform operations comprising:
    receiving an image that depicts an object;
    determining a first line passing through two features of the object;
    determining a second line that forms an angle relative to the first line;
    determining an orientation of the image based on the angle formed by the second line relative to the first line; and
    decoding data encoded within the image based on the determined orientation.

14. The non-transitory machine-readable medium of claim 13, wherein h second line is perpendicular to the first line.

15. The non-transitory machine-readable medium of claim 13, wherein the object is a face.

16. The non-transitory machine-readable medium of claim 13, the operations further comprising generating for display, on an electronic display, a graphical output based on the decoded data.

17. The non-transitory machine-readable medium of claim 13, wherein the angle is less than 45 degrees.

18. The non-transitory machine-readable medium of claim 13, wherein the two features comprise a midpoint of a mouth of a face and a tip of a nose of the face.

19. The non-transitory machine-readable medium of claim 13, the operations further comprising detecting the object based on a temperature associated with pixels in a first portion of the image corresponding to a specified range.

20. A system comprising:
one or more hardware processors; and
a memory comprising instructions which, when executed by the one or more processors, cause the one or more processors to perform operations comprising:
receiving an image that depicts an object;
determining a first line passing through two features of the object;
determining a second line that forms an angle relative to the first line;
determining an orientation of the image based on the angle formed by the second line relative to the first line; and
decoding data encoded within the image based on the determined orientation.

* * * * *